United States Patent [19]
Sekine et al.

[11] Patent Number: 5,866,035
[45] Date of Patent: Feb. 2, 1999

[54] LIQUID CRYSTAL MIXTURE AND LIQUID CRYSTAL DEVICE COMPRISING THE SAME

[75] Inventors: Chizu Sekine; Kyoko Yamamoto; Yoshiaki Tsubata; Koichi Fujisawa, all of Ibaraki, Japan

[73] Assignee: Sumitomo Chemical Company, Limited, Osaka, Japan

[21] Appl. No.: 774,686

[22] Filed: Dec. 26, 1996

[30] Foreign Application Priority Data

| Dec. 27, 1995 | [JP] | Japan | 7-353994 |
| Jun. 28, 1996 | [JP] | Japan | 8-169931 |
| Jul. 30, 1996 | [JP] | Japan | 8-200278 |
| Sep. 10, 1996 | [JP] | Japan | 8-239593 |
| Nov. 22, 1996 | [JP] | Japan | 8-312454 |

[51] Int. Cl.$^6$ .......................... C09K 19/06; C09K 19/34; C09K 19/30; C09K 19/12
[52] U.S. Cl. .................. 252/299.6; 252/299.61; 252/299.63; 252/299.64; 252/299.65; 252/299.66; 252/299.67; 252/299.01
[58] Field of Search ............................ 252/299.6, 299.63, 252/299.66, 299.01, 299.65, 299.61, 299.64, 299.67

[56] References Cited

U.S. PATENT DOCUMENTS

| 5,328,637 | 7/1994 | Buchecker | 252/299.6 |
| 5,380,461 | 1/1995 | Sato et al. | 252/299.61 |
| 5,653,911 | 8/1997 | Kondo et al. | 252/299.01 |
| 5,658,489 | 8/1997 | Higashi et al. | 252/299.01 |

FOREIGN PATENT DOCUMENTS

| 0377516 | 7/1990 | European Pat. Off. . |
| 0501268 | 9/1992 | European Pat. Off. . |
| 0648723 | 4/1995 | European Pat. Off. . |
| 0709444 | 5/1996 | European Pat. Off. . |
| 6-40966 | 2/1994 | Japan . |

*Primary Examiner*—C. H. Kelly
*Attorney, Agent, or Firm*—Birch, Stewart, Kolasch & Birch, LLP

[57] ABSTRACT

A liquid crystal mixture containing a compound of the formula (1) as an essential component, which has a large birefringence (Δn), an increased upper limit temperature of nematic phase and a widened temperature range of nematic phase, and a decreased responsiveness parameter.

15 Claims, No Drawings

LIQUID CRYSTAL MIXTURE AND LIQUID CRYSTAL DEVICE COMPRISING THE SAME

BACKGROUND OF THE INVENTION

1. Filed of the Invention

The present invention relates to a novel nematic liquid crystal mixture and a liquid crystal device comprising the same. In particular, the present invention relates to a liquid crystal mixture which has an effectively widened temperature range for the nematic phase and a low viscosity, and a liquid crystal device comprising the same, for example, an optical shutter, a display device such as a super twisted nematic (STN) liquid crystal device or a polymer dispersed liquid crystal (PDLC) device and the like.

2. Description of Related Art

The liquid crystal displays (LCD) have been widely spread as displays for personal computers, word processors and the like, because they have various characteristics such as low consumption of electric power, thinness, light weight, driving at a low voltage and the like. Among the liquid crystal devices one of typical examples of which is a liquid crystal display, a matrix type liquid crystal display which stores a large amount of information has two driving systems, that is, an active matrix system and a passive matrix system.

The STN liquid crystal devices are driven by a multiplex system, and in these years widely used as color LCD for notebook type computers since their response speed and viewing angle have been improved greatly.

TFT liquid crystal devices are installed in high performance personal computers since their image quality and yield have been improved, although they are more expensive than the STN liquid crystal devices.

However, the STN liquid crystal devices have advantages over the TFT liquid crystal devices in the cost, while they still have the insufficient viewing angle and response speed. The STN liquid crystal devices have some problems to be solved for further increase of the picture area, price reduction and increase of a density. In particular, the increase of response speed is essential for further increase of the picture area and density and for displaying video motion pictures.

A liquid crystal mixture contains a number of components for the optimization of a plurality of properties, and each component has its specific properties. For example, high speed STN liquid crystal devices having a reduced cell gap have been developed. A liquid crystal mixture used for such the high speed STN liquid crystal devices should contain a component having a large birefringence $\Delta n$ in addition to the conventional components such as one having the nematic phase in a high temperature range, one which can impart the dielectric anisotropy to the liquid crystal mixture.

In general, a mixture containing a component having the large $\Delta n$ has a high viscosity $\eta$, and is less suitable for increasing the response speed. That is, it is known that a ratio $\eta/\Delta n^2$ (a responsiveness parameter) is proportional to the response time, and therefore the liquid crystal having the smaller ratio $\eta/\Delta n^2$ has the better response properties (see Tatsuo Uchida, "Next Generation Liquid Crystal Display Techniques", KOGYOCHOSAKAI, page 136). Thus, liquid crystal mixtures having the larger $\Delta n$ and the smaller ratio $\eta/\Delta n^2$ have been sought. It is essential for the nematic phase to have a wide working temperature range including room temperature, and therefore a component which can effectively widen the lower and upper temperature limits is important.

Furthermore, it is essential to lower a threshold voltage from the view point of the low consumption of electric power.

SUMMARY OF THE INVENTION

One object of the present invention is to provide a liquid crystal mixture having a large birefringence, a low viscosity and a small responsiveness parameter $\eta/\Delta n^2$.

Another object of the present invention is to provide a liquid crystal mixture having a widened temperature range for the nematic phase.

Another object of the present invention is to provide a liquid crystal device comprising one of the above liquid crystal mixtures, which can be used as an optical shutter, display and the like.

According to the first aspect, the present invention provides a liquid crystal mixture comprising at least one compound of the formula (1):

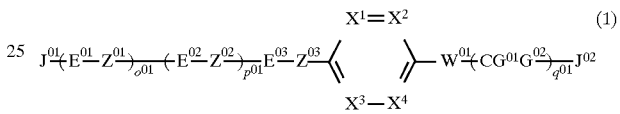

wherein $J^{01}$ represents a hydrogen or fluorine atom, a cyano group or a group of the formula: $J^{03}(O)m^{01}$ in which $J^{03}$ is a $C_1$–$C_{12}$ alkyl group, a $C_2$–$C_{12}$ alkenyl group or a $C_2$–$C_{12}$ alkynyl group, each of which may be substituted with a fluorine atom;

$E^{01}$, $E^{02}$ and $E^{03}$ represent, independently each other,

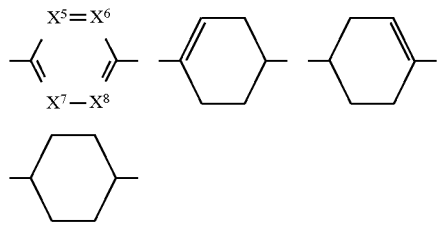

$Z^{01}$ and $Z^{02}$ represent, independently each other, a single bond, $-(CH_2)n^{01}-$, $-C\equiv C-$, $-CH=CH-$, $-CH_2O-$, $-OCH_2-$, $-COO-$, $-OCO-$ or $-O-$, and $Z^{03}$ represent a single bond, $-(CH_2)n^{01}-$, $-C\equiv C-$, $-CH=CH-$, $-CH_2O-$, $-OCH_2-$, $-COO-$, $-OCO-$, $-O-$ or $-CF=CF-$, provided that $Z^{01}$, $Z^{02}$ and $Z^{03}$ are not single bonds at the same time;

$n^{01}$ represents an integer of 1 to 4;

$m^{01}$, $o^{01}$, $p^{01}$ and $q^{01}$ represent, independently each other, 0 or 1;

$X^1$, $X^2$, $X^3$, $X^4$, $X^6$, $X^7$ and $X^8$ represent, independently each other, CH, CF or N;

$G^{01}$ and $G^{02}$ represent, independently each other, a hydrogen or fluorine atom, provided that they are not hydrogen atoms at the same time;

$W^{01}$ represent $-C\equiv C-$ or $-CY^{01}=CY^{02}-$ in which $Y^{01}$ and $Y^{02}$ represent, independently each other a hydrogen or fluorine atom, provided that $Y^{01}$ and $y^{02}$ are hydrogen atoms, $q^{01}$ is zero and $E^{01}$ and $E^{02}$ are not

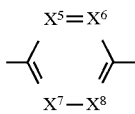

when $Z^{03}$ represents —CF=CF—, or provided that $W^{01}$ represents —CY$^{01}$=CY$^{02}$— in which at least one of $Y^{01}$ and $Y^{02}$ is a fluorine atom when $Z^{03}$ represent —C≡C— and $q^{01}$ is 0; and $J^{02}$ represents a $C_1$–$C_{12}$ alkyl group or a $C_1$–$C_{12}$ alkoxyalkyl group, each of which may be substituted with at least one fluorine atom, and at least one compound of the formula (2):

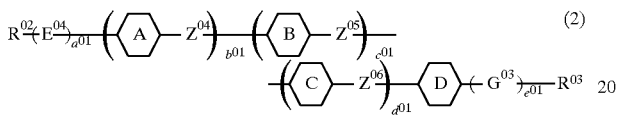

(2)

wherein the rings A, B, C and D represent, independently each other, 1,4-phenylene which may be substituted with 1, 2 or 3 fluorine atoms, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl or 5,2-dioxanediyl;

$R^{02}$ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group;

$R^{03}$ is a hydrogen or fluorine atom, a fluoromethyl group, a difluoromethyl group, a trifluoromethyl group, a fluoromethoxy group, a difluoromethoxy group, a trifluoromethoxy group, a cyano group, a $C_1$–$C_{12}$ alkyl group, a $C_2$–$C_{12}$ alkenyl group, a $C^1$–$C_{16}$ alkoxy group or a $C_2$–$C_{16}$ alkoxyalkyl group;

$Z^{04}$, $Z^{05}$ and $Z^{06}$ represent, independently each other, —COO—, —OCO—, —OCH$_2$—, —CH$_2$O—, a $C_1$–$C_5$ alkylene group, a $C_2$-$C_5$ alkenylene group, a $C_2$-$C_5$ alkynylene group or a single bond; $E^{04}$ and $G^{03}$ represent, independently each other, a methylene group or —O—; $a^{01}$, $b^{01}$, $c^{01}$, $d^{01}$ and $e^{01}$ represent, independently each other, 0 or 1, provide that the sum of $b^{01}$, $c^{01}$ and $d^{01}$ is at least 1 (one), with the proviso that $a^{01}$ is 0 when $R^{02}$ is an alkoxy group, that $e^{01}$ is 0 when $R^{03}$ is an alkoxy group, or with the proviso that, in the case where $R^{02}$ and $R^{03}$ are not alkoxy groups, $a^{01}$ is 1 when $b^{01}$ is 1 (one) and the ring A is 1,4-phenylene, 2,5-pyrimidinediyl, 5,2-pyrimidinediyl, 2,5-pyridinediyl or 5,2-pyridinediyl or when $b^{01}$ is 0, $c^{01}$ is 1 and the ring D is 1,4-phenylene, 2,5-pyrimidinediyl, 5,2-pyrimidinediyl, 2,5-pyridinediyl or 5,2-pyridinediyl or when $b^{01}$ is 0, $c^{01}$ is 0, $d^{01}$ is 1 and the ring C is 1,4-phenylene, 2,5-pyrimidinediyl, 5,2-pyrimidinediyl, 2,5-pyridinediyl or 5,2-pyridinediyl, or $e^{01}$ is 1 when the ring D is 1,4-phenylene, 2,5-pyrimidinediyl, 5,2-pyrimidinediyl, 2,5-pyrimidinediyl or 5,2-pyridiendiyl, which compound (2) is not a compound of the formula (1).

According to the second aspect, the present invention provides a liquid crystal mixture comprising at least one compound of the formula (1) and at least one compound selected from the group consisting of a compound of the formula (3):

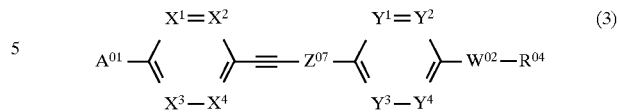

(3)

wherein $R^{04}$ is a $C_1$–$C_{12}$ alkyl group, a $C_2$–$C_{16}$ alkenyl group or a $C_2$–$C_{16}$ alkoxyalkyl group which may be substituted with at least one fluorine atom;

$X^1$, $X^2$, $X^3$, $X^4$, $Y^1$, $y^2$, $y^3$ and $Y^4$ represent, independently each other, CH, CF or N;

$A^{01}$ is a hydrogen atom, a 4-$R^{05}$-(cycloalkyl) group, a 4-R05-(cycloalkenyl) group or a $R^{05}$-(O)$r^{01}$ group in which $R^{05}$ is a $C^1$–$C_{12}$ alkyl group, a $C_2$–$C_{12}$ alkenyl group, a $C_2$–$C_{12}$ alkynyl group or a $C_2$–$C_{12}$ alkoxyalkyl group, each of which may be substituted with at least one fluorine atom;

$W^{02}$ is trans —C=C— or —C≡C—;

$Z^{07}$ is —C≡C— or a single bond; and $r^{01}$ represents 0 or 1, a compound of the formula (4):

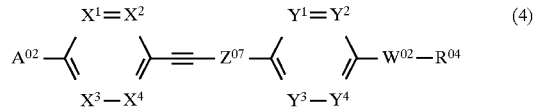

(4)

wherein $A^{02}$ is a fluorine atom, a trifluoromethyl or trifluoromethoxy group or a cyano group, and $R^{04}$, $X^1$, $X^2$, $X^3$, $X^4$, $Y^1$, $y^2$, $y^3$, $y^4$, $W^{02}$ and $Z^{07}$ are the same as defined above, and a compound of the formula (5):

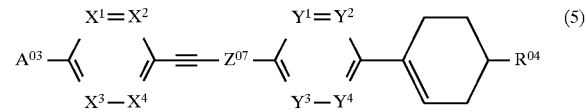

(5)

wherein $A^{03}$ is a fluorine atom, a trifluoromethyl group, a trifluoromethoxy group, a cyano group, a $C_1$–$C_{12}$ alkyl group, a $C_2$–$C_{12}$ alkenyl group, a $C_2$–$C_{12}$ alkoxyalkyl group, 4-$R^{05}$-(cycloalkyl) group, a 4-$R^{05}$-(cycloalkenyl) group or a $R^{05}$-(O)$r^{01}$ group, and $R^{04}$, $X^1$, $X^2$, $X^3$, $X^4$, $Y^1$, $y^2$, $y^3$, $Y^4$, $W^{02}$, $Z^{07}$ and $R^{05}$ are the same as defined above.

According to the third aspect, the present invention provides a liquid crystal mixture comprising at least one compound of the formula (1), at least one compound of the formula (2), and at least one compound selected from the group consisting of a compound of the formula (3), a compound of the formula (4) and a compound of the formula (5).

According to the fourth aspect, the present invention provides a liquid crystal mixture comprising at least one compound of the formula (1), at least one compound of the formula (2), and at least one compound selected from the group consisting of a compound of the formula (6):

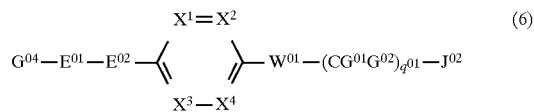

(6)

wherein $G^{04}$ is a hydrogen or fluorine atom, a cyano group or $G^{05}$—(O)$y^{01}$ in which $G^{05}$ is a $C_1$–$C_{12}$ alkyl group, a $C_2$–$C_{12}$ alkenyl group, a $C_2$–$C_{12}$ alkynyl group, each of which may be substituted with at least one fluorine atom, and $y^{01}$ is 0 or 1;

$E^{01}$ and $E^{02}$ represent, independently each other,

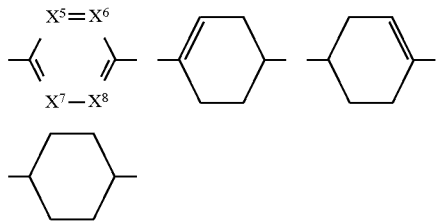

provided that at least one of $E^{01}$ and $E^{02}$ is a cyclohexylene or cyclohexulene group, and $X^1, X^2, X^3, X^4, X^5, X^6, X^7, X^8$, $W^{01}, G^{01}, G^{02}, J^{02}$ and $q^{01}$ are the same as defined above, and a compound of the formula (7):

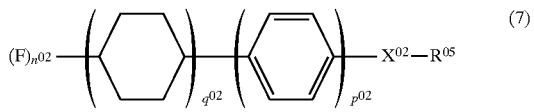

wherein the benzene may be substituted with 1, 2 or 3 fluorine atoms; $R^{05}$ is a $C_1$–$C_{10}$ alkyl group; $n^{02}, p^{02}$, and $q^{02}$ represent, independently each other, 1 or 2; $X^{02}$ is trans —CH=CH— or —C≡C—, provided that $X^{02}$ may be —CH$_2$CH$_2$— when $n^{02}$ is 1.

According to the fifth aspect, the present invention provides a liquid crystal mixture comprising at least one compound of the formula (1), at least one compound selected from the group consisting of a compound of the formula (3), a compound of the formula (4) and a compound of the formula (5), and at least one compound selected from the group consisting of a compound of the formula (6) and a compound of the formula (7).

According to the sixth aspect, the present invention provides a liquid crystal mixture comprising at least one compound of the formula (1), at least one compound of the formula (2), at least one compound selected from the group consisting of a compound of the formula (3), a compound of the formula (4) and a compound of the formula (5), and at least one compound selected from the group consisting of a compound of the formula (6) and a compound of the formula (7).

According to the seventh aspect, the present invention provides a liquid crystal device comprising a pair of electrode substrates, and a layer of a liquid crystal mixture selected from the above liquid crystal mixtures interposed between said pair of the electrode substrates.

DETAILED DESCRIPTION OF THE INVENTION

The liquid crystal mixture of the present invention is obtained by combining the compounds of the formulas (1) to (7) as described above, and has the excellent properties which are sought by the present invention.

The ring D in the formula (2) is preferably 1,4-phenylene, 1,4-cyclohexylene which may be substituted with 1, 2 or 3 fluorine atoms, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-dioxanediyl, 5,2-dioxanediyl, 2,5-pyrimidinediyl, 5,2-pyrimidinediyl or 2,5-pyridinediyl.

The compound of the formula (2) is preferably a compound of the formula (8):

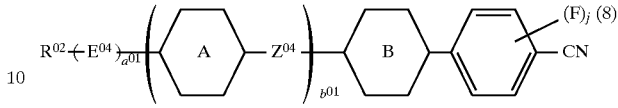

wherein $R^{02}$, $E^{04}$, the rings A and B, $Z^{04}$, $a^{01}$ and $b^{01}$ are the same as defined above and j is 0, 1 or 2, a compound of the formula (9):

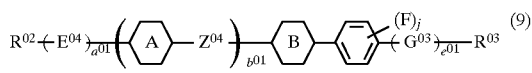

wherein $R^{02}$, $R^{03}$, the rings A and B, $E^{04}$, $G^{03}$, $Z^{04}$, $e^{01}$, $a^{01}$, $b^{01}$ and are the same as defined above, a compound of the formula (10):

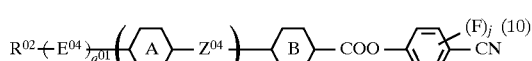

wherein $R^{02}$, $R^{03}$, the rings A and B, $E^{04}$, $Z^{04}$, $a^{01}$, $b^{01}$ and j are the same as defined above, and a compound of the formula (11):

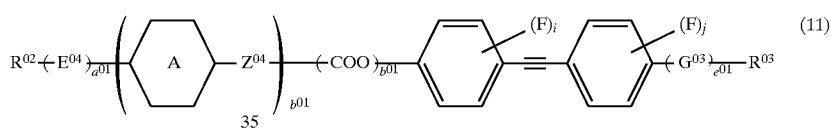

wherein $R^{02}$, $R^{03}$, the rings A and B, $E^{04}$, $G^{03}$, $Z^{04}$, $a^{01}$, $b^{01}$, $e^{01}$ and j are the same as defined above, and i is 0, 1 or 2.

The compound of the formula (1) will be explained.

Examples of the moiety represented by the formula (12):

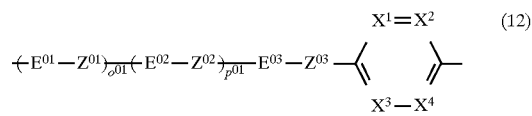

are following moieties in which $s^{01}$, $t^{01}$ and $u^{01}$ are each an integer of 0 to 4:

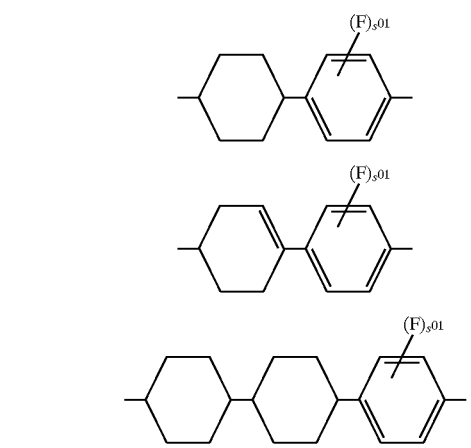

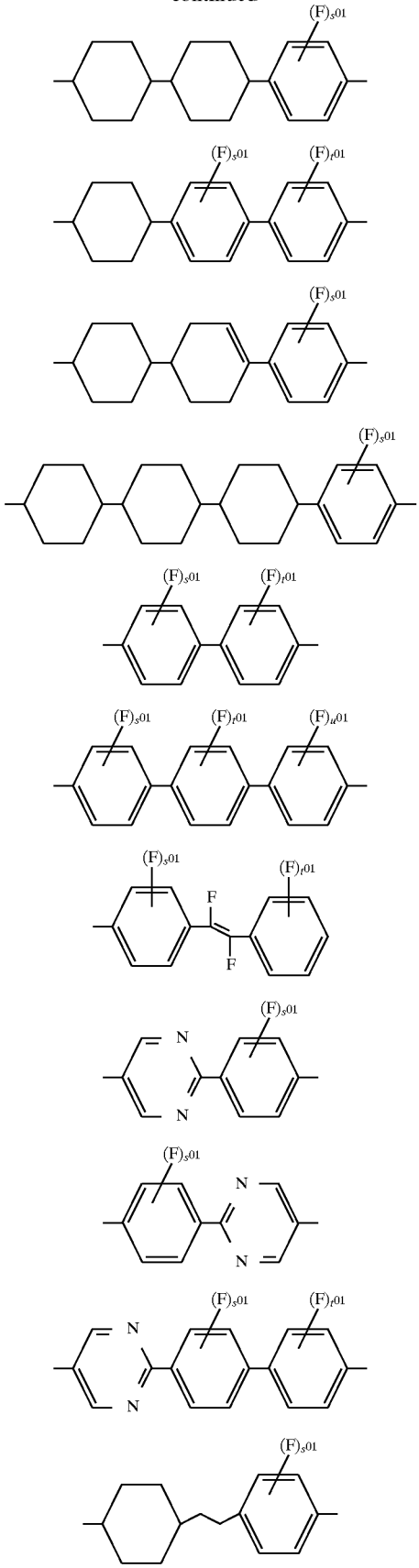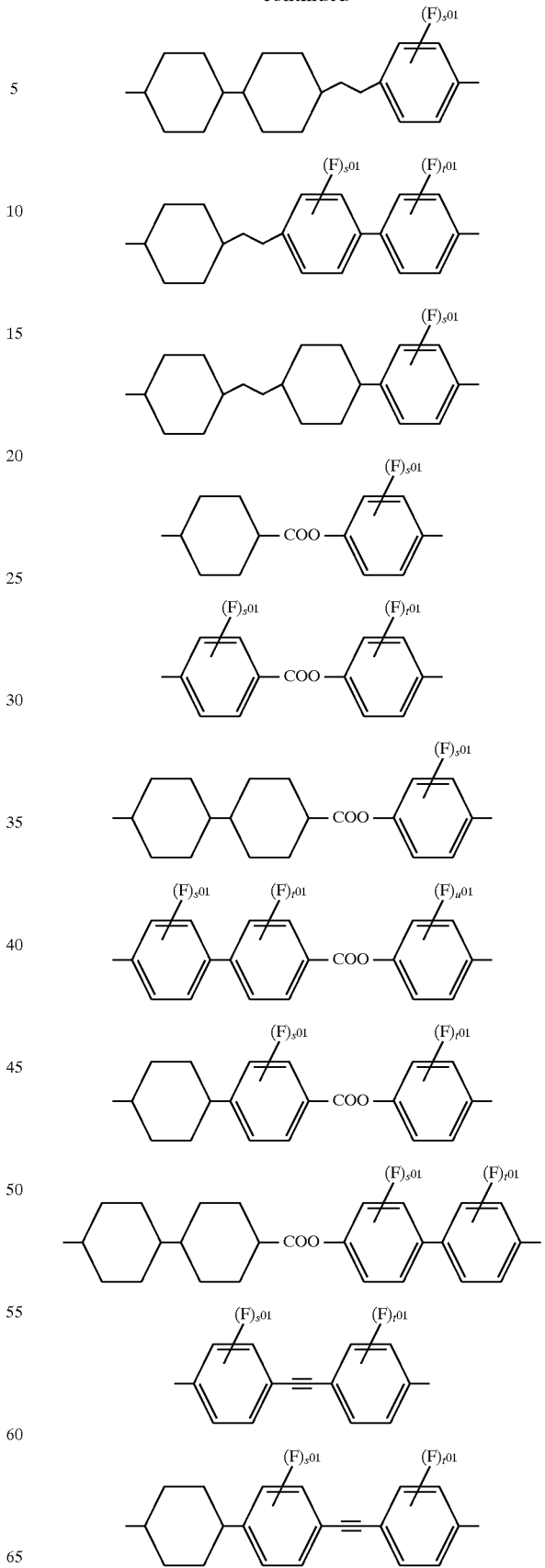

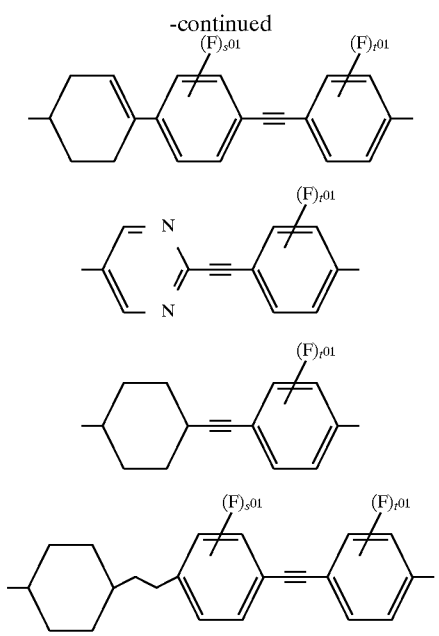

$J^{01}$ may be methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, propynyl, butynyl, pentynyl, hexynyl, heptynyl, octynyl, nonynyl, decynyl, dodecynyl, methoxy, ethoxy, propoxy, butoxy, pentyloxy, hexyloxy, heptyloxy, octyloxy, nonyloxy, decyloxy, undecyloxy, dodecyloxy, vinyloxy, propenyloxy, butenyloxy, pentenyloxy, hexenyloxy, heptenyloxy, octenyloxy, nonenyloxy, decenyloxy, propynyloxy, butynyloxy, pentynyloxy, hexynyloxy, heptynyloxy, octynyloxy, nonynyloxy, decynyloxy, undecynyloxy, dodecynyloxy, trifluoromethyl, trifluoromethoxy, difluoromethyl, trifluoroethyl, tetrafluoroethyl, pentafluoroethyl, cyano, hydrogen or fluorine atom, etc.

$J^{02}$ may be methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, etc.

Specific examples of the compound of the formula (1) are as follows:

1-(1,2-difluoro-1-(E)-pentenyl)-4-[2-(4-propylphenyl)-ethynyl]benzene,
1-(1,2-difluoro-1-(E)-heptenyl)-4-[2-(4-propylphenyl)-ethynyl]benzene,
1-(1,2-difluoro-1-(E)-butenyl)-4-[2-(4-propylphenyl)-ethynyl]benzene,
1-(1,2-difluoro-1-(E)-hexenyl)-4-[2-(4-methylphenyl)-ethynyl]benzene,
1-(1,2-difluoro-1-(E)-hexenyl)-4-[2-(4-ethylphenyl)-ethynyl]benzene,
1-(1,2-difluoro-1-(E)-hexenyl)-4-[2-(4-butylphenyl)-ethynyl]benzene,
1-(1,2-difluoro-1-(E)-hexenyl)-4-[2-(4-pentylphenyl)-ethynyl]benzene,
1-(1,2-difluoro-1-(E)-hexenyl)-4-[2-(4-hexylphenyl)-ethynyl]benzene,
1-(1,2-difluoro-1-(E)-hexenyl)-4-[2-(4-heptylphenyl)-ethynyl]benzene,
1-(1,2-difluoro-1-(E)-hexenyl)-4-[2-(4-methoxyphenyl)-ethynyl]benzene,
1-(1,2-difluoro-1-(E)-hexenyl)-4-[2-(4-ethoxyphenyl)-ethynyl]benzene,
1-(1,2-difluoro-1-(E)-hexenyl)-3-fluoro-4-[2-(4-pentylphenyl)ethynyl]benzene,
1-(1,2-difluoro-1-(E)-hexenyl)-2-fluoro-4-[2-(4-pentylphenyl)ethynyl]benzene,
1-(1-fluoro-1-(E)-pentenyl)-4-[2-(4-propynylphenyl)-ethynyl]benzene,
1-(2-fluoro-1-(E)-pentenyl)-4-[2-(4-propynylphenyl)-ethynyl]benzene,
1-(1-fluoro-1-(E)-butenyl)-4-[2-(4-propynylphenyl)-ethynyl]benzene,
1-(2-fluoro-1-(E)-hexenyl)-4-[2-(4-methylphenyl)-ethynyl]benzene,
1-(1-fluoro-1-(E)-hexenyl)-4-[2-(4-ethylphenyl)-ethynyl]benzene,
1-(2-fluoro-1-(E)-hexenyl)-4-[2-(4-butylphenyl)-ethynyl]benzene,
1-(1-fluoro-1-(E)-hexenyl)-4-[2-(4-pentylphenyl)-ethynyl]benzene,
1-(2-fluoro-1-(E)-hexenyl)-4-[2-(4-hexylphenyl)-ethynyl]benzene,
1-(1-fluoro-1-(E)-hexenyl)-4-[2-(4-heptylphenyl)-ethynyl]benzene,
1-(2-fluoro-1-(E)-hexenyl)-4-[2-(4-methoxyphenyl)-ethynyl]benzene,
1-(1-fluoro-1-(E)-hexenyl)-4-[2-(4-ethoxyphenyl)-ethynyl]benzene,
1-(2-fluoro-1-(E)-hexenyl)-3-fluoro-4-[2-(4-pentylphenyl)ethynyl]benzene,
1-(1-fluoro-1-(E)-hexenyl)-2-fluoro-4-[2-(4-pentylphenyl)ethynyl]benzene,
4-(1,2-difluoro-1-(E)-hexenyl)-1-[2-(4-pentylcyclohexylphenyl)ethynyl]benzene,
4-(1,2-difluoro-1-(E)-hexenyl)-3-fluoro-1-[2-(4-propylcyclohexylphenyl)ethynyl]benzene,
4-(1-fluoro-1-(E)-hexenyl)-1-[2-(4-propylcyclohexylphenyl)ethynyl]benzene,
4-[2-{4-(1,2-difluoro-1-(E)-pentenyl)phenyl}ethyl]-benzonitrile,
4-[2-{4-(1,2-difluoro-1-(E)-heptenyl)phenyl}ethyl]-benzonitrile,
4-[2-{4-(1-fluoro-1-(E)-pentenyl)phenyl}ethyl]-benzonitrile,
4-[2-{4-(2-fluoro-1-(E)-pentenyl)phenyl}ethyl]-benzonitrile,
4-[2-{4-(1,2-difluoro-1-(E)-pentenyl)phenyl}ethyl]-3-fluorobenzonitrile, 4-[2-{4-(1,2-difluoro-1-(E)-hexenyl)phenyl}ethyl]-3-fluorobenzonitrile,
4-[2-{4-(1,2-difluoro-1-(E)-pentenyl)phenyl}ethyl]-3-fluorobenzonitrile,
4-[2-{4-(1-fluoro-1-(E)-pentenyl)phenyl}ethyl]-3-fluorobenzonitrile,
4-[2-{4-(2-fluoro-1-(E)-pentenyl)phenyl}ethyl]-3-fluorobenzonitrile,
1-(1,2-difluoro-1-(E)-heptenyl)-4-[2-(4-trifluoromethoxyphenyl)ethynyl]benzene,
1-(1,2-difluoro-1-(E)-hexenyl)-4-[2-(4-trifluoromethoxyphenyl)ethynyl]benzene,
1-(1,2-difluoro-1-(E)-pentenyl)-4-[2-(4-trifluoromethoxyphenyl)ethynyl]benzene,
1-(1,2-difluoro-1-(E)-heptenyl)-3-fluoro-4-[2-(4-trifluoromethoxyphenyl)ethynyl]benzene,
1-(1,2-difluoro-1-(E)-hexenyl)-3-fluoro-4-[2-(4-trifluoromethoxyphenyl)ethynyl]benzene,
1-(1,2-difluoro-1-(E)-pentenyl)-3-fluoro-4-[2-(4-trifluoromethoxyphenyl)ethynyl]benzene,
1-(1-fluoro-1-(E)-heptenyl)-4-[2-(4-trifluoromethoxyphenyl)ethynyl]benzene,
1-(2-fluoro-1-(E)-hexenyl)-4-[2-(4-trifluoromethoxyphenyl)ethynyl]benzene,
1-(1-fluoro-1-(E)-pentenyl)-4-[2-(4-trifluoromethoxyphenyl)ethynyl]benzene,
1-(1-fluoro-1-(E)-hexenyl)-3-fluoro-4-[2-(4-trifluoromethoxyphenyl)ethynyl]benzene,
1-(2-fluoro-1-(E)-pentenyl)-3-fluoro-4-[2-(4-trifluoromethoxyphenyl)ethynyl]benzene,
4-(1,2-difluoro-1-(E)-hexenyl)-1-(4-trans-propylcyclohexyl]benzene,
4-(1-fluoro-1-(E)-hexenyl)-1-(4-trans-propylcyclohexyl]benzene,
4-(1,2-difluoro-1-(E)-pentenyl)-1-(4-trans-propylcyclohexyl]benzene,
4-(1,2-difluoro-1-(E)-hexenyl)-1-[4-(4-trans-propylcyclohexyl)cyclohexyl]benzene,
4-(1,2-difluoro-1-(E)-pentenyl)-1-[4-(4-trans-propylcyclohexyl)cyclohexyl]benzene,
4-(1,2-difluoro-1-(E)-hexenyl)-2-fluoro-1-[4-(4-trans-propylcyclohexyl)cyclohexyl]benzene,
4-(1,2-difluoro-1-(E)-hexenyl)-3-fluoro-1-[4-(4-trans-propylcyclohexyl)cyclohexyl]benzene,
4-(1-fluoro-1-(E)-hexenyl)-1-[4-(4-trans-propylcyclohexyl)cyclohexyl]benzene,
4-(2-fluoro-1-(E)-pentenyl)-1-[4-(4-trans-propylcyclohexyl)cyclohexyl]benzene,
2-fluoro-4-(1-fluoro-1-(E)-hexenyl)-1-[4-(4-trans-propylcyclohexyl)cyclohexyl]benzene,
3-fluoro-4-(2-fluoro-1-(E)-hexenyl)-1-[4-(4-trans-propylcyclohexyl)cyclohexyl]benzene,
4-(1,2-difluoro-1-(E)-hexenyl)-4'-propylbiphenyl,
4-(1,2-difluoro-1-(E)-propenyl)-4'-propylbiphenyl,
4-(1,2-difluoro-1-(E)-heptenyl)-4'-propylbiphenyl,
4-(1,2-difluoro-1-(E)-hexenyl)-4'-methylbiphenyl,
4-(1,2-difluoro-1-(E)-heptenyl)-4'-ethylbiphenyl,
4-(1,2-difluoro-1-(E)-heptenyl)-4'-pentylbiphenyl,
4-(1,2-difluoro-1-(E)-nonenyl)-4'-decylbiphenyl,
4-(1,2-difluoro-1-(E)-nonenyl)-4'-nonylbiphenyl,
4-(1,2-difluoro-1-(E)-hexenyl)-4'-fluorobiphenyl,
4-(1,2-difluoro-1-(E)-hexenyl)-4'-cyanobiphenyl,
4-(1,2-difluoro-1-(E)-hexenyl)-3'-fluoro-4'-cyanobiphenyl,
2-fluoro-4-(1,2-difluoro-1-(E)-hexenyl)-4'-propylbiphenyl,
2'-fluoro-4-(1,2-difluoro-1-(E)-hexenyl)-4'-propylbiphenyl,
3-fluoro-4-(1,2-difluoro-1-(E)-hexenyl)-4'-propylbiphenyl,
2,3-difluoro-4-(1,2-difluoro-1-(E)-hexenyl)-4'-propylbiphenyl,
2,3-difluoro-4-(1,2-difluoro-1-(E)-nonenyl)-4'-decylbiphenyl,
4-(1-fluoro-1-(E)-hexenyl)-4'-propylbiphenyl,
4-(2-fluoro-1-(E)-propenyl)-4'-propylbiphenyl, 4-(1-fluoro-1-(E)-heptenyl)-4'-propylbiphenyl,
4-(2-fluoro-1-(E)-hexenyl)-4'-methylbiphenyl,
4-(1-fluoro-1-(E)-heptenyl)-4'-ethylbiphenyl,
4-(2-fluoro-1-(E)-heptenyl)-4'-pentylbiphenyl,
4-(1-fluoro-1-(E)-nonenyl)-4'-decylbiphenyl,
4-(2-fluoro-1-(E)-nonenyl)-4'-nonylbiphenyl,
4-(1-fluoro-1-(E)-hexenyl)-4'-fluorobiphenyl,
4-(2-fluoro-1-(E)-hexenyl)-4'-cyanobiphenyl,
4-(1-fluoro-1-(E)-hexenyl)-3'-fluoro-4'-cyanobiphenyl,
2-fluoro-4-(2-fluoro-1-(E)-hexenyl)-4'-propylbiphenyl,
2'-fluoro-4-(1-fluoro-1-(E)-hexenyl)-4'-propylbiphenyl,
3-fluoro-4-(2-fluoro-1-(E)-hexenyl)-4'-propylbiphenyl,
2,3-difluoro-4-(1-fluoro-1-(E)-hexenyl)-4'-propylbiphenyl,
2,3-difluoro-4-(1-fluoro-1-(E)-nonenyl)-4'-decylbiphenyl,
4-(1,2-difluoro-1-(E)-hexenyl)-4"-propyl-p-terphenyl,
4-(1,2-difluoro-1-(E)-hexenyl)-4"-cyano-p-terphenyl,
4-(1,2-difluoro-1-(E)-hexenyl)-4"-cyano-3"-fluoro-p-terphenyl,
4-(1-fluoro-1-(E)-hexenyl)-4"-propyl-p-terphenyl,
4-(2-fluoro-1-(E)-hexenyl)-4"-cyano-p-terphenyl,
2-[4-{1-(1,2-difluoro-1-(E)-hexenyl)}phenyl]-5-propylpyrimidine,
2-[4-{1-(1,2-difluoro-1-(E)-pentenyl)}phenyl]-5-propylpyrimidine,
2-[4-{1-(1,2-difluoro-1-(E)-nonenyl)}phenyl]-5-decylpyrimidine,
2-[4-{1-(1,2-difluoro-1-(E)-nonenyl)}-2,3-difluorophenyl]-5-decylpyrimidine,
2-[4-{1-(1,2-difluoro-1-(E)-nonenyl)}-3-fluorophenyl]-5-decylpyrimidine,
2-[4-{1-(1-fluoro-1-(E)-hexenyl)}phenyl]-5-propylpyrimidine,
2-[4-{1-(2-fluoro-1-(E)-pentenyl)}phenyl]-5-propylpyrimidine,
2-[4-{1-(1-fluoro-1-(E)-nonenyl)}phenyl]-5-decylpyrimidine,
2-[4-{1-(2-fluoro-1-(E)-nonenyl)}-2,3-difluorophenyl]-5-decylpyrimidine,
2-[4-{1-(1-fluoro-1-(E)-nonenyl)}-3-fluorophenyl]-5-decylpyrimidine,
1-(4-methylphenylmethyl)-4-(1,2-difluoro-1-(E)-pentenyl)benzene,
1-(4-ethylphenylmethyl)-4-(1,2-difluoro-1-(E)-pentenyl)benzene, 1-(4-propylphenylmethyl)-4-(1-fluoro-1-(E)-pentenyl)-benzene,
1-(4-propylphenylmethyl)-4-(1,2-difluoro-1-(E)-hexenyl)benzene,
1-(4-propylphenylmethyl)-4-(2-fluoro-1-(E)-heptenyl)-benzene,
1-(4-trifluoromethylphenylmethyl)-4-(1,2-difluoro-1-(E)-pentenyl)benzene,
1-(3,4,5-trifluorophenylmethyl)-4-(1-fluoro-1-(E)-pentenyl)benzene,
1-[2-(4-methylphenyl)ethyl]-4-(1,2-difluoro-1-(E)-pentenyl)benzene,
1-[2-(4-ethylphenyl)ethyl]-4-(2-fluoro-1-(E)-pentenyl)-benzene,
1-[2-(4-propylphenyl)ethyl]-4-(1,2-difluoro-1-(E)-pentenyl)benzene,
1-[2-(4-butylphenyl)ethyl]-4-(1-fluoro-1-(E)-pentenyl)-benzene,
1-[2-(4-pentylphenyl)ethyl]-4-(1,2-difluoro-1-(E)-pentenyl)benzene,
1-[2-(4-hexylphenyl)ethyl]-4-(2-fluoro-1-(E)-pentenyl)-benzene,
1-[2-(4-heptylphenyl)ethyl]-4-( ,2-difluoro-1-(E)-pentenyl)benzene,
1-[2-(4-octylphenyl)ethyl]-4-( 1-fluoro-1-(E)-pentenyl)-benzene,
1-[2-(4-nonylphenyl)ethyl]-4-(1,2-difluoro-1-(E)-pentenyl)benzene,
1-[2-(4-decylphenyl)ethyl]-4-(2-fluoro-1-(E)-pentenyl)-benzene,
1-[2-(4-propylphenyl)ethyl]-4-(1,2-difluoro-1-(E)-propenyl)benzene,
1-[2-(4-propylphenyl)ethyl]-4-(1-fluoro-1-(E)-butenyl)-benzene,
1-[2-(4-propylphenyl)ethyl]-4-(1,2-difluoro-1-(E)-hexenyl)benzene,
1-[2-(4-propylphenyl)ethyl]-4-(2-fluoro-1-(E)-heptenyl)benzene,
1-[2-(4-propylphenyl)ethyl]-4-(1,2-difluoro-1-(E)-octenyl)benzene,
1-[2-(4-decylphenyl)ethyl]-4-(1-fluoro-1-(E)-nonenyl)-benzene,
1-[2-(4-decylphenyl)ethyl]-4-(1,2-difluoro-1-(E)-nonenyl)benzene,
1-(4-propylcyclohexyl)-4-[2-{4-(2-fluoro-1-(E)-propenyl)phenyl}ethyl]benzene,
1-(4-propylcyclohexyl)-4-[2-{4-(1,2-difluoro-1-(E)-butenyl)phenyl}ethyl]benzene,
1-(4-propylcyclohexyl)-4-[2-{4-(1-fluoro-1-(E)-pentenyl)phenyl}ethyl]benzene,
1-(4-propylcyclohexyl)-4-[2-{4-(1,2-difluoro-1-(E)-hexenyl)phenyl}ethyl]benzene,
1-(4-propylcyclohexyl)-4-[2-{4-(2-fluoro-1-(E)-heptenyl)phenyl}ethyl]benzene,
1-(4-propylcyclohexyl)-4-[2-{4-(1,2-difluoro-1-(E)-octenyl)phenyl}ethyl]benzene,
1-(4-propylcyclohexyl)-4-[2-{4-(1-fluoro-1-(E)-nonenyl)phenyl}ethyl]benzene,
1-(4-butylcyclohexyl)-4-[2-{4-(1,2-difluoro-1-(E)-pentenyl)phenyl}ethyl]benzene,
1-(4-pentylcyclohexyl)-4-[2-{4-(2-fluoro-1-(E)-pentenyl)phenyl}ethyl]benzene, 1-(4-propyl-1-cyclohexenyl)-4-[2-{4-(1,2-difluoro-1-(E)-pentenyl)phenyl}ethyl]benzene,
1-(4-propyl-1-cyclohexenyl)-4-[2-{4-(1-fluoro-1-(E)-heptenyl)phenyl}ethyl]benzene,
1-[2-(4-trifluoromethylphenyl)ethyl]-4-(1,2-difluoro-1-(E)-pentenyl)benzene,
1-[2-(4-cyanophenyl)ethyl]-4-(2-fluoro-1-(E)-pentenyl)-benzene,
1-[2-(4-fluorophenyl)ethyl]-4-(1,2-difluoro-1-(E)-pentenyl)benzene,
1-[2-(3,4-difluorophenyl)ethyl]-4-(1-fluoro-1-(E)-pentenyl)benzene,
1-[2-(3,4-difluorophenyl)ethyl]-4-(1,2-difluoro-1-(E)-heptenyl)benzene,
1-[2-(3,4,5-trifluorophenyl)ethyl]-4-(2-fluoro-1-(E)-propenyl)benzene,
1-[2-(3,4,5-trifluorophenyl)ethyl]-4-(1,2-difluoro-1-(E)-butenyl)benzene,
1-[2-(3,4,5-trifluorophenyl)ethyl]-4-(1-fluoro-1-(E)-pentenyl)benzene,
1-[2-(3,4,5-trifluorophenyl)ethyl]-4-(1,2-difluoro-1-(E)-hexenyl)benzene,
1-[2-(3,4,5-trifluorophenyl)ethyl]-4-(2-fluoro- 1-(E)-heptenyl)benzene,
1-[2-(3,4,5-trifluorophenyl)ethyl]-4-(1,2-difluoro-1-(E)-octenyl)benzene,
1-[2-(3,4,5-trifluorophenyl)ethyl]-4-(1-fluoro-1-(E)-nonenyl)benzene,
1-[2-(4-propyl-3,5-difluorophenyl)ethyl]-4-(1,2-difluoro-1-(E)-propenyl)benzene,
1-[2-(4-propyl-3,5-difluorophenyl)ethyl]-4-(2-fluoro-1-(E)-butenyl)benzene,
1-[2-(4-propyl-3,5-difluorophenyl)ethyl]-4-(1,2-difluoro-1-(E)-pentenyl)benzene,
1-[2-(4-propyl-3,5-difluorophenyl)ethyl]-4-(1-fluoro-1-(E)-hexenyl)benzene,
1-[2-(4-propyl-3,5-difluorophenyl)ethyl]-4-(1,2-difluoro-1-(E)-heptenyl)benzene,
1-[2-(4-methyl-3,5-difluorophenyl)ethyl]-4-(2-fluoro-1-(E)-pentenyl)benzene,
1-[2-(4-ethyl-3,5-difluorophenyl)ethyl]-4-(1,2-difluoro-1-(E)-pentenyl)benzene,
1-[2-(4-butyl-3,5-difluorophenyl)ethyl]-4-(1-fluoro-1-(E)-pentenyl)benzene,
1-[2-(4-pentyl-3,5-difluorophenyl)ethyl]-4-(1,2-difluoro-1-(E)-pentenyl)benzene,
2-fluoro-1-[2-(4-propylphenyl)ethyl]-4-(2-fluoro-1-(E)-pentenyl)benzene,
2-fluoro-1-[2-(4-propylphenyl)ethyl]-4-(1,2-difluoro-1-(E)-hexenyl)benzene,
2-fluoro-1-[2-(4-propylphenyl)ethyl]-4-(1-fluoro-1-(E)-heptenyl)benzene,
3-fluoro-1-[2-(4-propylphenyl)ethyl]-4-(1,2-difluoro-1-(E)-pentenyl)benzene,
3-fluoro-1-[2-(4-propylphenyl)ethyl]-4-(2-fluoro-1-(E)-hexenyl)benzene,
2-fluoro-1-[2-(3,4,5-trifluorophenyl)ethyl]-4-(1,2-difluoro-1-(E)-pentenyl)benzene,
2,6-difluoro-1-[2-(3,4,5-trifluorophenyl)ethyl]-4-(1-fluoro-1-(E)-pentenyl)benzene,
2-fluoro-1-[2-(3,4-difluorophenyl)ethyl]-4-(1,2-difluoro-1-(E)-pentenyl)benzene, 2,6-difluoro-1-[2-(3,4-difluorophenyl)ethyl]-4-(2-fluoro-1-(E)-pentenyl)benzene, 2,6-difluoro-1-[2-(4-propyl-3,5-difluorophenyl)ethyl]-4-(1,2-difluoro-1-(E)-pentenyl)benzene, 2,6-difluoro-1-[2-(4-trifluoromethyl-3,5-difluorophenyl)ethyl]-4-(1-fluoro-1-(E)-pentenyl)benzene, 2,6-difluoro-1-[2-(4-trifluoromethoxy-3,5-difluorophenyl)ethyl]-4-(1,2-difluoro-1-(E)-pentenyl)benzene, 1-[2-(4-cyano-3-fluorophenyl)ethyl]-4-(2-fluoro-1-(E)-pentenyl)benzene, 1-[2-(4-cyano-3-fluorophenyl)ethyl]-4-(1,2-difluoro-1-(E)-heptenyl)benzene, 1-[2-(4-cyano-3-fluorophenyl)ethyl]-2-fluoro-4-(1-fluoro-1-(E)-pentenyl)benzene, 1-[2-(4-cyano-3-fluorophenyl)ethyl]-2,6-difluoro-4-(1,2-difluoro-1-(E)-pentenyl)benzene, 1-[2-(4-cyano-3,5-difluorophenyl)ethyl]-4-(2-fluoro-1-(E)-pentenyl)benzene, 1-[2-(4-cyano-3,5-difluorophenyl)ethyl]-2-fluoro-4-(1,2-difluoro-1-(E)-pentenyl)benzene, 1-[2-(4-cyano-3,5-difluorophenyl)ethyl]-2,6-difluoro-4-(1-fluoro-1-(E)-pentenyl)benzene, 1-(4,4-difluorocyclohexyl)-4-[2-{4-(1,2-difluoro-1-(E)-pentenyl)phenyl}ethyl]benzene, 1-(4-fluorocyclohexyl)-4-[2-{4-(2-fluoro-1-(E)-pentenyl)phenyl}ethyl]benzene, 1-[2-(4'-propyl-dicyclohexyl)ethyl]-4-(1,2-difluoro-1-(E)-pentenyl)benzene, 1-[2-(4',4-dipropyl-dicyclohexyl)ethyl]-4-(1-fluoro-1-(E)-pentenyl)benzene, 1-[2-(4'-fluoro-dicyclohexyl)ethyl]-4-(1,2-difluoro-1-(E)-pentenyl)benzene, 1-[2-(4',4-difluoro-dicyclohexyl)ethyl]-4-(2-fluoro-1-(E)-pentenyl)benzene, (page 19 of the Japanese text)

1-[3-(4-propylphenyl)propyl]-4-(1,2-difluoro-1-(E)-pentenyl)benzene,

1-[3-(3,4-difluorophenyl)propyl]-4-(1-fluoro-1-(E)-pentenyl)benzene,

1-[3-(3,4,5-trifluorophenyl)propyl]-4-(1,2-difluoro-1-(E)-pentenyl)benzene,

1-[4-(4-propylphenyl)butyl]-4-(2-fluoro-1-(E)-pentenyl)benzene,

1-[4-(3,4-difluorophenyl)butyl]-4-(1,2-difluoro-1-(E)-pentenyl)benzene,

1-[4-(3,4,5-trifluorophenyl)butyl]-4-(1-fluoro-1-(E)-pentenyl)benzene,

1-[4-(3,5-difluoro-4-propylphenyl)butyl]-4-(1,2-difluoro-1-(E)-pentenyl)benzene, 4-(4-methylbenzyloxy)-1-(2-fluoro-1-(E)-pentenyl)benzene, 4-(4-ethylbenzyloxy)-1-(1,2-difluoro-1-(E)-pentenyl)benzene, 4-(4-propylbenzyloxy)-1-(1-fluoro-1-(E)-pentenyl)benzene, 4-(4-butylbenzyloxy)-1-(1,2-difluoro-1-(E)-pentenyl)benzene, 4-(4-pentylbenzyloxy)-1-(2-fluoro-1-(E)-pentenyl)benzene, 4-(4-hexylbenzyloxy)-1-(1,2-difluoro-1-(E)-pentenyl)benzene, 4-(4-heptylbenzyloxy)-1-(1-fluoro-1-(E)-pentenyl)benzene, 4-(4-octylbenzyloxy)-1-(1,2-difluoro-1-(E)-pentenyl)benzene, 4-(4-propylbenzyloxy)-1-(2-fluoro-1-(E)-heptenyl)benzene, 4-(4-nonylbenzyloxy)-1-(1,2-difluoro-1-(E)-heptenyl)benzene, 4-(4-hexylbenzyloxy)-1-(1-fluoro-1-(E)-nonenyl)benzene, 4-(4-heptylbenzyloxy)-1-(1,2-difluoro-1-(E)-nonenyl)benzene, 4-(4-octylbenzyloxy)-1-(2-fluoro-1-(E)-nonenyl)benzene, 4-(4-nonylbenzyloxy)-1-(1,2-difluoro-1-(E)-nonenyl)benzene, 4-(4-decylbenzyloxy)-1-(1-fluoro-1-(E)-nonenyl)benzene, 4-(4-undecylbenzyloxy)-1-(1,2-difluoro-1-(E)-nonenyl)benzene, 4-(4-trifluorobenzyloxy)-1-(2-fluoro-1-(E)-pentenyl)benzene, 4-(4-trifluorobenzyloxy)-1-(1,2-difluoro-1-(E)-heptenyl)benzene, 4-(4-cyanobenzyloxy)-1-(1-fluoro-1-(E)-pentenyl)benzene, 1-(4-(E)-pentenylbenzyloxy)-4-methyl benzene, 1-(4-(E)-pentenylbenzyloxy)-4-ethylbenzene, 1-(4-(E)-pentenylbenzyloxy)-4-propylbenzene, 1-(4-(E)-pentenylbenzyloxy)-4-butylbenzene, 1-(4-(E)-pentenylbenzyloxy)-4-pentylbenzene, 1-(4-(E)-hexenylbenzyloxy)-4-propylbenzene, 1-(4-(E)-heptenylbenzyloxy)-4-propylbenzene, 1-(4-(E)-pentenylbenzyloxy)-4-trifluoromethylbenzene, 1-(4-(E)-pentenylbenzyloxy)-3,4,5-trifluorobenzene, 1-(4-(E)-pentenylbenzyloxy)-4-cyanobenzene, 4-(4-methylphenoxy)-1-(1,2-difluoro-1-(E)-pentenyl)benzene, 4-(4-ethylphenoxy)-1-(2-fluoro-1-(E)-pentenyl)-benzene, 4-(4-propylphenoxy)-1-(1,2-difluoro-1-(E)-pentenyl)benzene, 4-(4-butylphenoxy)-1-(1-fluoro-1-(E)-pentenyl)-benzene, 4-(4-pentylphenoxy)-1-(1,2-difluoro-1-(E)-pentenyl)benzene, 4-(4-hexylphenoxy)-1-(2-fluoro-1-(E)-pentenyl)benzene, 4-(4-propylphenoxy)-1-(1,2-difluoro-1-(E)-propenyl)benzene, 4-(4-propylphenoxy)-1-(1-fluoro-1-(E)-butenyl)benzene, 4-(4-propylphenoxy)-1-(1,2-difluoro-1-(E)-pentenyl)benzene, 4-(4-propylphenoxy)-1-(2-fluoro-1-(E)-hexenyl)benzene, 4-(4-propylphenoxy)-1-(1,2-difluoro-1-(E)-heptenyl)benzene, 4-(4-propylphenoxy)-1-(1-fluoro-1-(E)-octenyl)benzene, 4-(4-trifluoromethylphenoxy)-1-(1,2-difluoro-1-(E)-pentenyl)benzene,

[4-(2-fluoro-1-(E)-propenyl)]phenyl-(4-propyl)benzoate,

[4-(1,2-difluoro-1-(E)-butenyl)]phenyl-(4-propyl)-benzoate,

[4-(1-fluoro-1-(E)-pentenyl)]phenyl-(4-propyl)benzoate,
[4-(1,2-difluoro-1-(E)-hexenyl)]phenyl-(4-propyl)-benzoate,
[4-(2-fluoro-1-(E)-heptenyl)]phenyl-(4-propyl)benzoate,
[4-(1,2-difluoro-1-(E)-octenyl)]phenyl-(4-propyl)-benzoate,
[4-(1-fluoro-1-(E)-pentenyl)]phenyl-(4-methyl)-benzoate,
[4-(1,2-difluoro-1-(E)-pentenyl)]phenyl-(4-ethyl)-benzoate,
[4-(2-fluoro-1-(E)-pentenyl)]phenyl-(4-propyl)benzoate,
[4-(1,2-difluoro-1-(E)-pentenyl)]phenyl-(4-butyl)-benzoate,
[4-(1-fluoro-1-(E)-pentenyl)]phenyl-(4-pentyl)benzoate,
[4-(1,2-difluoro-1-(E)-propenyl)]phenyl-[4-(4-propylcyclohexyl)]benzoate,
[4-(2-fluoro-1-(E)-butenyl)]phenyl-[4-(4-propylcyclohexyl)]benzoate,
[4-(1,2-difluoro-1-(E)-pentenyl)]phenyl-[4-(4-propylcyclohexyl)]benzoate,
[4-(1-fluoro-1-(E)-hexenyl)]phenyl-[4-(4-propylcyclohexyl)]benzoate,
[4-(1,2-fluoro-1-(E)-heptenyl)]phenyl-[4-(4-propylcyclohexyl)]benzoate,
[4-(2-fluoro-1-(E)-octenyl)]phenyl-[4-(4-propylcyclohexyl)]benzoate,
[4-(1,2-difluoro-1-(E)-heptenyl)]phenyl-[4-(4-methylcyclohexyl)]benzoate,
[4-(1-fluoro-1-(E)-pentenyl)]phenyl-[4-(4-ethylcyclohexyl)]benzoate,
[4-(1,2-difluoro-1-(E)-pentenyl)]phenyl-[4-(4-butylcyclohexyl)]benzoate,
[4-(2-fluoro-1-(E)-pentenyl)]phenyl-[4-(4-pentylcyclohexyl)]benzoate,
[4-(1,2-difluoro-1-(E)-pentenyl)]phenyl-[4-(4-propylcyclohexyl)]benzoate,
[4-(1-fluoro-1-(E)-pentenyl)]phenyl-[4-(4-pentylcyclohexyl)]benzoate,
[4-(1,2-difluoro-1-(E)-propenyl)]phenyl-(4-cyano-3-fluoro)benzoate,
[4-(2-fluoro-1-(E)-butenyl)]phenyl-(4-cyano-3-fluoro)benzoate,
[4-(1,2-difluoro-1-(E)-pentenyl)]phenyl-(4-cyano-3-fluoro)benzoate,
[4-(1-fluoro-1-(E)-hexenyl)]phenyl-(4-cyano-3-fluoro)benzoate,
[4-(1,2-difluoro-1-(E)-heptenyl)]phenyl-(4-cyano-3-fluoro)benzoate,
[4-(2-fluoro-1-(E)-octenyl)]phenyl-(4-cyano-3-fluoro)benzoate,
[4-(1,2-difluoro-1-(E)-propenyl)]phenyl-(4-cyano-3,4-difluoro)benzoate,
[4-(1-fluoro-1-(E)-pentenyl)]phenyl-(3,4-difluoro)-benzoate,
[4-(1,2-difluoro-1-(E)-heptenyl)]phenyl-(3,4-difluoro)-benzoate,
[4-(2-fluoro-1-(E)-propenyl)]phenyl-(3,4,5-trifluoro)-benzoate,
[4-(1,2-difluoro-1-(E)-pentenyl)]phenyl-(3,4,5-trifluoro)benzoate,
[4-(1-fluoro-1-(E)-heptenyl)]phenyl-(3,4,5-trifluoro)-benzoate,
4-methylphenyl-[4-(1,2-difluoro-1-(E)-pentenyl)]-benzoate,
4-ethylphenyl-[4-(2-fluoro-1-(E)-pentenyl)]benzoate,
4-propylphenyl-[4-(1,2-difluoro-1-(E)-pentenyl)]-benzoate,
4-butylphenyl-[4-(1-fluoro-1-(E)-pentenyl)]benzoate,
4-pentylphenyl-[4-(1,2-difluoro-1-(E)-pentenyl)]-benzoate,
4-hexylphenyl-[4-(2-fluoro-1-(E)-pentenyl)]benzoate,
4-heptylphenyl-[4-(1,2-difluoro-1-(E)-pentenyl)]-benzoate,
4-octylphenyl-[4-(1-fluoro-1-(E)-nonenyl)]benzoate,
4-nonylphenyl-[4-(1,2-difluoro-1-(E)-nonenyl)]benzoate,
4-decylphenyl-[4-(2-difluoro-1-(E)-nonenyl)]benzoate,
4-undecylphenyl-[4-(1,2-difluoro-1-(E)-nonenyl)]-benzoate,
4-octyloxyphenyl-[4-(1-fluoro-1-(E)-nonenyl)]benzoate,
4-nonyloxyphenyl-[4-(1,2-difluoro-1-(E)-nonenyl)]-benzoate,
4-decyloxyphenyl-[4-(2-fluoro-1-(E)-nonenyl)]benzoate,
4-(4-methylcyclohexyl)phenyl-[4-(1,2-difluoro-1-(E)-pentenyl)]benzoate,
4-(4-ethylcyclohexyl)phenyl-[4-(1-fluoro-1-(E)-pentenyl)]benzoate,
4-(4-propylcyclohexyl)phenyl-[4-(1,2-difluoro-1-(E)-pentenyl)]benzoate,
4-(4-butylcyclohexyl)phenyl-[4-(2-fluoro-1-(E)-pentenyl)]benzoate,
4-(4-pentylcyclohexyl)phenyl-[4-(1,2-difluoro-1-(E)-pentenyl)]benzoate,
4-(4-hexylcyclohexyl)phenyl-[4-(1-fluoro-1-(E)-pentenyl)]benzoate,
4-(4-propylcyclohexyl)phenyl-[4-(1,2-difluoro-1-(E)-propenyl)]benzoate,
4-(4-propylcyclohexyl)phenyl-[4-(2-fluoro-1-(E)-butenyl)]benzoate,
4-(4-propylcyclohexyl)phenyl-[4-(1,2-difluoro-1-(E)-hexenyl)]benzoate,
4-(4-propylcyclohexyl)phenyl-[4-(1-fluoro-1-(E)-heptenyl)]benzoate,
4-(4-propylcyclohexyl)phenyl-[4-(1,2-difluoro-1-(E)-octenyl)]benzoate,
4-(4-propylcyclohexyl)phenyl-[4-(2-fluoro-1-(E)-pentenyl)]benzoate,
4-(4-cyano-3-fluoro)phenyl-[4-(1,2-difluoro-1-(E)-pentenyl)]benzoate,
4-(4-cyano-3-fluoro)phenyl-[4-(1-fluoro-1-(E)-heptenyl)]benzoate,
4-(3,4-difluoro)phenyl-[4-(1,2-difluoro-1-(E)-pentenyl)]benzoate,
4-(3,4-difluoro)phenyl-[4-(2-fluoro-1-(E)-heptenyl)]-benzoate,
4-(3,4,5-trifluoro)phenyl-[4-(1,2-difluoro-1-(E)-pentenyl)]benzoate,
4-(3,4,5-trifluoro)phenyl-[4-(1-fluoro-1-(E)-heptenyl)]-benzoate,
1-(4-methylphenyl-methyl)-4-(1-(E)-pentenyl)benzene,
1-(4-ethylphenyl-methyl)-4-(1-(E)-pentenyl)benzene,
1-(4-propylphenyl-methyl)-4-(1-(E)-pentenyl)benzene,
1-(4-propylphenyl-methyl)-4-(1-(E)-hexenyl)benzene, 1-(4-propylphenyl-methyl)-4-(1-(E)-heptenyl)benzene,
1-(4-trifluoromethylphenyl-methyl)-4-(1-(E)-pentenyl)-benzene,
1-(3,4,5-trifluorophenyl-methyl)-4-(1-(E)-pentenyl)benzene,
1-[2-(4-methylphenyl)ethyl]-4-(1-(E)-pentenyl)benzene,
1-[2-(4-ethylphenyl)ethyl]-4-(1-(E)-pentenyl)benzene,
1-[2-(4-propylphenyl)ethyl]-4-(1-(E)-pentenyl)benzene
1-[2-(4-butylphenyl)ethyl]-4-(1-(E)-pentenyl)benzene,
1-[2-(4-pentylphenyl)ethyl]-4-(1-(E)-pentenyl)benzene,
1-[2-(4-hexylphenyl)ethyl]-4-(1-(E)-pentenyl)benzene,
1-[2-(4-heptylphenyl)ethyl]-4-(1-(E)-pentenyl)benzene,
1-[2-(4-octylphenyl)ethyl]-4-(1-(E)-pentenyl)benzene,
1-[2-(4-nonylphenyl)ethyl]-4-(1-(E)-pentenyl)benzene,
1-[2-(4-decylphenyl)ethyl]-4-(1-(E)-pentenyl)benzene,
1-[2-(4-propylphenyl)ethyl]-4-(1-(E)-propenyl)benzene,
1-[2-(4-propylphenyl)ethyl]-4-(1-(E)-butenyl)benzene,
1-(2-(4-propylphenyl)ethyl]-4-(1-(E)-hexenyl)benzene,
1-[2-(4-propylphenyl)ethyl]-4-(1-(E)-heptenyl)benzene,
1-[2-(4-propylphenyl)ethyl]-4-(1-(E)-octenyl)benzene,
1-[2-(4-decylphenyl)ethyl]-4-(1-(E)-nonenyl)benzene,
1-[2-(4-decyloxyphenyl)ethyl]-4-(1-(E)-nonenyl)-benzene,
1-(4-propylcyclohexyl)-4-[2-{4-(1-(E)-propenyl)phenyl}-ethyl]benzene,
1-(4-propylcyclohexyl)-4-[2-{4-(1-(E)-butenyl)phenyl}-ethyl]benzene,
1-(4-propylcyclohexyl)-4-[2-{4-(1-(E)-pentenyl)phenyl}-ethyl]benzene,
1-(4-propylcyclohexyl)-4-[2-{4-(1-(E)-hexenyl)phenyl}-ethyl]benzene,
1-(4-propylcyclohexyl)-4-[2-{4-(1-(E)-heptenyl)phenyl}-ethyl]benzene,
1-(4-propylcyclohexyl)-4-[2-{4-(1-(E)-octenyl)phenyl}-ethyl]benzene,
1-(4-propylcyclohexyl)-4-[2-{4-(1-(E)-nonenyl)phenyl}-ethyl]benzene,
1-(4-butylcyclohexyl)-4-[2-{4-(1-(E)-pentenyl)phenyl}-ethyl]benzene,
1-(4-pentylcyclohexyl)-4-[2-{4-(1-(E)-pentenyl)phenyl}-ethyl]benzene,
1-(4-propyl-1-cyclohexenyl)-4-[2-{4-(1-(E)-pentenyl)-phenyl}ethyl]benzene,
1-(4-propyl-1-cyclohexenyl)-4-[2-{4-(1-(E)-heptenyl)-phenyl}ethyl]benzene,
1-{2-(4-trifluoromethylphenyl)ethyl}-4-(1-(E)-pentenyl)benzene,
1-{2-(4-cyanophenyl)ethyl}-4-(1-(E)-pentenyl)benzene,
1-{2-(4-fluorophenyl)ethyl}-4-(1-(E)-pentenyl)benzene,
1-{2-(3,4-difluorophenyl)ethyl}-4-(1-(E)-pentenyl)-benzene,
1-{2-(3,4-difluorophenyl)ethyl}-4-(1-(E)-heptenyl)-benzene,
1-{2-(3,4,5-trifluorophenyl)ethyl}-4-(1-(E)-propenyl)-benzene,
1-{2-(3,4,5-trifluorophenyl)ethyl}-4-(1-(E)-butenyl)-benzene,
1-{2-(3,4,5-trifluorophenyl)ethyl}-4-(1-(E)-pentenyl)-benzene,
1-{2-(3,4,5-trifluorophenyl)ethyl}-4-(1-(E)-hexenyl)-benzene,
1-{2-(3,4,5-trifluorophenyl)ethyl}-4-(1-(E)-heptenyl)-benzene,
1-{2-(3,4,5-trifluorophenyl)ethyl}-4-(1-(E)-octenyl)-benzene,
1-{2-(3,4,5-trifluorophenyl)ethyl}-4-(1-(E)-nonenyl)-benzene,
1-{2-(4-propyl-3,5-difluorophenyl)ethyl}-4-(1-(E)-propenyl)benzene,
1-{2-(4-propyl-3,5-difluorophenyl)ethyl}-4-(1-(E)-butenyl)benzene,
1-{2-(4-propyl-3,5-difluorophenyl)ethyl}-4-(1-(E)-pentenyl)benzene,
1-{2-(4-propyl-3,5-difluorophenyl)ethyl}-4-(1-(E)-hexenyl)benzene,
1-{2-(4-propyl-3,5-difluorophenyl)ethyl}-4-(1-(E)-heptenyl)benzene,
1-{2-(4-methyl-3,5-difluorophenyl)ethyl}-4-(1-(E)-pentenyl)benzene,
1-{2-(4-ethyl-3,5-difluorophenyl)ethyl}-4-(1-(E)-pentenyl)benzene,
1-{2-(4-butyl-3,5-difluorophenyl)ethyl}-4-(1-(E)-pentenyl)benzene,
1-{2-(4-pentyl-3,5-difluorophenyl)ethyl}-4-(1-(E)-pentenyl)benzene,
2-fluoro-1-{2-(4-propylphenyl)ethyl}-4-(1-(E)-pentenyl)benzene,
2-fluoro-1-{2-(4-propylphenyl)ethyl}-4-(1-(E)-hexenyl)-benzene,
2-fluoro-1-{2-(4-propylphenyl)ethyl}-4-(1-(E)-heptenyl)benzene,
3-fluoro-1-{2-(4-propylphenyl)ethyl}-4-(1-(E)-pentenyl)benzene,
3-fluoro-1-{2-(4-propylphenyl)ethyl}-4-(1-(E)-hexenyl)-benzene,
2-fluoro-1-{2-(3,4,5-trifluorophenyl)ethyl}-4-(1-(E)-pentenyl)benzene,
2,6-difluoro-1-{2-(3,4,5-trifluorophenyl)ethyl}-4-(1-(E)-pentenyl)benzene,
2-fluoro-1-{2-(3,4-difluorophenyl)ethyl}-4-(1-(E)-pentenyl)benzene,
2,6-difluoro-1-{2-(3,4-difluorophenyl)ethyl}-4-(1-(E)-pentenyl)benzene,
2,6-difluoro-1-{2-(4-propyl-3,5-difluorophenyl)ethyl}-4-(1-(E)-pentenyl)benzene,
2,6-difluoro-1-(2-(4-trifluoromethyl-3,5-difluoro-phenyl)ethyl}-4-(1-(E)-pentenyl)benzene,
2,6-difluoro-1-{2-(4-trifluoromethoxy-3,5-difluorophenyl)ethyl}-4-(1-(E)-pentenyl)benzene,
1-{2-(4-cyano-3-fluorophenyl)ethyl}-4-(1-(E)-pentenyl)-benzene,
1-{2-(4-cyano-3-fluorophenyl)ethyl}-4-(1-(E)-heptenyl)-benzene,
1-{2-(4-cyano-3-fluorophenyl)ethyl}-2-fluoro-4-(1-(E)-pentenyl)benzene,
1-{2-(4-cyano-3-fluorophenyl)ethyl}-2,6-difluoro-4-(1-(E)-pentenyl)benzene,
1-{2-(4-cyano-3,5-difluorophenyl)ethyl}-4-(1-(E)-pentenyl)benzene,
1-{2-(4-cyano-3,5-difluorophenyl)ethyl}-2-fluoro-4-(1-(E)-pentenyl)benzene,
1-{2-(4-cyano-3,5-difluorophenyl)ethyl}-2,6-difluoro-4-(1-(E)-pentenyl)benzene, 1-(4,4-difluorocyclohexyl)-4-[2-{4-(1-(E)-pentenyl)-phenyl}ethyl]benzene,
1-(4-fluorocyclohexyl)-4-[2-{4-(1-(E)-pentenyl)phenyl}-ethyl]benzene,
1-{2-(4'-propyl-dicyclohexyl)ethyl}-4-(1-(E)-pentenyl)-benzene,
1-{2-(4',4'-dipropyl-dicyclohexyl)ethyl}-4-(1-(E)-pentenyl)benzene,
1-{2-(4'-fluoro-dicyclohexyl)ethyl}-4-(1-(E)-pentenyl)-benzene,
1-{2-(4',4'-difluoro-dicyclohexyl)ethyl}-4-(1-(E)-pentenyl)benzene,
1-{3-(4-propylphenyl)propyl}-4-(1-(E)-pentenyl)-benzene,
1-{3-(3,4-difluorophenyl)propyl}-4-(1-(E)-pentenyl)-benzene,
1-{3-(3,4,5-trifluorophenyl)propyl}-4-(1-(E)-pentenyl)-benzene,
1-{4-(4-propylphenyl)butyl}-4-(1-(E)-pentenyl)benzene,
1-{4-(3,4-difluorophenyl)butyl}-4-(1-(E)-pentenyl)-benzene,
1-{4-(3,4,5-trifluorophenyl)butyl}-4-(1-(E)-pentenyl)-benzene,
1-{4-(3,5-difluoro-4-propylphenyl)butyl}-4-(1-(E)-pentenyl)benzene,
4-(4-methylbenzyloxy)-1-(1-(E)-pentenyl)benzene,
4-(4-ethylbenzyloxy)-1-(1-(E)-pentenyl)benzene,
4-(4-propylbenzyloxy)-1-(1-(E)-pentenyl)benzene,
4-(4-butylbenzyloxy)-1-(1-(E)-pentenyl)benzene,
4-(4-pentylbenzyloxy)-1-(1-(E)-pentenyl)benzene,
4-(4-hexylbenzyloxy)-1-(1-(E)-pentenyl)benzene,
4-(4-heptylbenzyloxy)-1-(1-(E)-pentenyl)benzene,
4-(4-octylbenzyloxy)-1-(1-(E)-pentenyl)benzene,
4-(4-propylbenzyloxy)-1-(1-(E)-heptenyl)benzene,
4-(4-nonylbenzyloxy)-1-(1-(E)-heptenyl)benzene,
4-(4-hexylbenzyloxy)-1-(1-(E)-nonenyl)benzene,
4-(4-heptylbenzyloxy)-1-(1-(E)-nonenyl)benzene,
4-(4-octylbenzyloxy)-1-(1-(E)-nonenyl)benzene,
4-(4-nonylbenzyloxy)-1-(1-(E)-nonenyl)benzene,
4-(4-decylbenzyloxy)-1-(1-(E)-nonenyl)benzene,
4-(4-undecylbenzyloxy)-1-(1-(E)-nonenyl)benzene,
4-(4-trifluoromethylbenzyloxy)-1-(1-(E)-pentenyl)-benzene,
4-(4-trifluoromethylbenzyloxy)-1-(1-(E)-heptenyl)-benzene,
4-(4-cyanolbenzyloxy)-1-(1-(E)-pentenyl)benzene,
1-(4-(E)-pentenylbenzyloxy)-4-methylbenzene,
1-(4-(E)-pentenylbenzyloxy)-4-ethylbenzene,
1-(4-(E)-pentenylbenzyloxy)-4-propylbenzene,
1-(4-(E)-pentenylbenzyloxy)-4-butylbenzene,
1-(4-(E)-pentenylbenzyloxy)-4-pentylbenzene,
1-(4-(E)-pentenylbenzyloxy)-4-hexylbenzene,
1-(4-(E)-hexenylbenzyloxy)-4-propylbenzene,
1-(4-(E)-heptenylbenzyloxy)-4-propylbenzene,
1-(4-(E)-pentenylbenzyloxy)-4-trifluoromethylbenzene,
1-(4-(E)-pentenylbenzyloxy)-3,4,5-trifluorobenzene,
1-(4-(E)-pentenylbenzyloxy)-4-cyanobenzene,
1-(4-methylphenoxy)-1-(1-(E)-pentenyl)benzene,
1-(4-ethylphenoxy)-1-(1-(E)-pentenyl)benzene,
1-(4-propylphenoxy)-1-(1-(E)-pentenyl)benzene,
1-(4-butylphenoxy)-1-(1-(E)-pentenyl)benzene,
1-(4-pentylphenoxy)-1-(1-(E)-pentenyl)benzene,
1-(4-hexylphenoxy)-1-(1-(E)-pentenyl)benzene,
1-(4-propylphenoxy)-1-(1-(E)-propenyl)benzene,
1-(4-propylphenoxy)-1-(1-(E)-butenyl)benzene,
1-(4-propylphenoxy)-1-(1-(E)-pentenyl)benzene,
1-(4-propylphenoxy)-1-(1-(E)-hexenyl)benzene,
1-(4-propylphenoxy)-1-(1-(E)-heptenyl)benzene,
1-(4-propylphenoxy)-1-(1-(E)-octenyl)benzene,
1-(4-trifluoromethylphenoxy)-1-(1-(E)-pentenyl)-benzene,
{4-(1-(E)-propenyl)}phenyl-(4-propyl)benzoate,
{4-(1-(E)-butenyl)}phenyl-(4-propyl)benzoate,
{4-(1-(E)-pentenyl)}phenyl-(4-propyl)benzoate,
{4-(1-(E)-hexenyl)}phenyl-(4-propyl)benzoate,
{4-(1-(E)-octenyl)}phenyl-(4-propyl)benzoate,
{4-(1-(E)-pentenyl)}phenyl-(4-methyl)benzoate,
{4-(1-(E)-pentenyl)}phenyl-(4-ethyl)benzoate,
{4-(1-(E)-pentenyl)}phenyl-(4-propyl)benzoate,
{4-(1-(E)-pentenyl)}phenyl-(4-butyl)benzoate,
{4-(1-(E)-pentenyl)}phenyl-(4-pentyl)benzoate,
{4-(1-(E)-propenyl)}phenyl-{4-(4-propylcyclohexyl)}-benzoate,
{4-(1-(E)-butenyl)}phenyl-{4-(4-propylcyclohexyl)}-benzoate,
{4-(1-(E)-pentenyl)}phenyl-{4-(4-propylcyclohexyl)}-benzoate,
{4-(1-(E)-hexenyl)}phenyl-{4-(4-propylcyclohexyl)}-benzoate,
{4-(1-(E)-heptenyl)}phenyl-{4-(4-propylcyclohexyl)}-benzoate,
{4-(1-(E)-octenyl)}phenyl-{4-(4-propylcyclohexyl)}-benzoate,
{4-(1-(E)-pentenyl)}phenyl-{4-(4-methylcyclohexyl)}-benzoate,
{4-(1-(E)-pentenyl)}phenyl-{4-(4-ethylcyclohexyl)}-benzoate,
{4-(1-(E)-pentenyl)}phenyl-{4-(4-butylcyclohexyl)}-benzoate,
{4-(1-(E)-pentenyl)}phenyl-{4-(4-pentylcyclohexyl)}-benzoate,
{4-(1-(E)-pentenyl)}phenyl-{4-(4-propylcyclohexyl)}-benzoate,
{4-(1-(E)-pentenyl)}phenyl-{4-(4-pentylcyclohexyl)}-benzoate,
{4-(1-(E)-propenyl)}phenyl-(4-cyano-3-fluoro)benzoate,
{4-(1-(E)-butenyl)}phenyl-(4-cyano-3-fluoro)benzoate,
{4-(1-(E)-pentenyl)}phenyl-(4-cyano-3-fluoro)benzoate,
{4-(1-(E)-hexenyl)}phenyl-(4-cyano-3-fluoro)benzoate,
{4-(1-(E)-heptenyl)}phenyl-(4-cyano-3-fluoro)benzoate,
{4-(1-(E)-octenyl)}phenyl-(4-cyano-3-fluoro)benzoate,
{4-(1-(E)-propenyl)}phenyl-(3,4-difluoro)benzoate,
{4-(1-(E)-pentenyl)}phenyl-(3,4-difluoro)benzoate,
{4-(1-(E)-heptenyl)}phenyl-(3,4-difluoro)benzoate,
{4-(1-(E)-propenyl)}phenyl-(3,4,5-trifluoro)benzoate,
{4-(1-(E)-pentenyl)}phenyl-(3,4,5-trifluoro)benzoate,
{4-(1-(E)-heptenyl)}phenyl-(3,4,5-trifluoro)benzoate,
4-methylphenyl-{4-(1-(E)-pentenyl)}benzoate, 4-ethylphenyl-{4-(1-(E)-pentenyl)}benzoate,
4-propylphenyl-{4-(1-(E)-pentenyl)}benzoate,
4-butylphenyl-{4-(1-(E)-pentenyl)}benzoate,
4-pentylphenyl-{4-(1-(E)-pentenyl)}benzoate,
4-hexylphenyl-{4-(1-(E)-pentenyl)}benzoate,
4-heptylphenyl-{4-(1-(E)-pentenyl)}benzoate,
4-octylphenyl-{4-( 1-(E)-nonenyl)}benzoate,
4-nonylphenyl-{4-(1-(E)-nonenyl)}benzoate,
4-decylphenyl-{4-(1-(E)-nonenyl)}benzoate,
4-undecylphenyl-{4-(1-(E)-nonenyl)}benzoate,
4-octyloxyphenyl-{4-(1-(E)-nonenyl)}benzoate,
4-nonyloxyphenyl-{4-(1-(E)-nonenyl)}benzoate,
4-decyloxyphenyl-{4-(1-(E)-nonenyl)}benzoate,
4-(4-methylcyclohexyl)phenyl-{4-(1-(E)-pentenyl)}-benzoate,
4-(4-ethylcyclohexyl)phenyl-{4-(1-(E)-pentenyl)}-benzoate,
4-(4-propylcyclohexyl)phenyl-{4-(1-(E)-pentenyl)}-benzoate,
4-(4-butylcyclohexyl)phenyl-{4-(1-(E)-pentenyl)}-benzoate,
4-(4-pentylcyclohexyl)phenyl-{4-(1-(E)-pentenyl)}-benzoate,
4-(4-hexylcyclohexyl)phenyl-{4-(1-(E)-pentenyl)}-benzoate,
4-(4-propylcyclohexyl)phenyl-{4-(1-(E)-propenyl)}-benzoate,
4-(4-propylcyclohexyl)phenyl-{4-(1-(E)-butenyl)}-benzoate,
4-(4-propylcyclohexyl)phenyl-{4-(1-(E)-hexenyl)}-benzoate,
4-(4-propylcyclohexyl)phenyl-{4-(1-(E)-heptenyl)}-benzoate,
4-(4-propylcyclohexyl)phenyl-{4-(1-(E)-octenyl)}-benzoate,
4-(4-propylcyclohexenyl)phenyl-{4-(1-(E)-pentenyl)}-benzoate,
4-(4-cyano-3-fluoro)phenyl-{4-(1-(E)-pentenyl)}-benzoate,
4-(4-cyano-3-fluoro)phenyl-{4-(1-(E)-heptenyl)}-benzoate,
4-(3,4-difluoro)phenyl-{4-(1-(E)-pentenyl)}benzoate,
4-(3,4-difluoro)phenyl-{4-(1-(E)-heptenyl)}benzoate,
4-(3,4,5-trifluoro)phenyl-{4-(1-(E)-pentenyl)}benzoate,
4-(3,4,5-trifluoro)phenyl-{4-(1-(E)-heptenyl)}benzoate, The compound of the formula (1) may be prepared by the condensation of a compound of the formula (13):

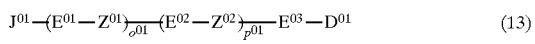
(13)

wherein $J^{01}$, $E^{01}$, $E^{02}$, $E^{03}$, $Z^{01}$, $Z^{02}$, $o^{01}$ and $p^{01}$ are the same as defined above, and $D^{01}$ represents $-(CH_2)_{n01}-MgBr$ when $Z^{03}$ is $-(CH_2)_{n01}-$; $-C\equiv CH$ when $Z^{03}$ is $-C\equiv C-$; $-CH=CH-B(OH)_2$ when $Z^{03}$ is $-CH=CH-$; $-CH_2L^{01}$ when $Z^{03}$ is $-CH_2O-$; $-OH$ when $Z^{03}$ is $-OCH_2-$, $-OCO-$ or $-O-$; $-COOH$ when $Z^{03}$ is $-COO-$; or $-MgBr$, $-L^{01}$ or $-B(OH)_2$ when $Z^{03}$ is a single bond in which $L^{01}$ is a halogen atom or $-OSO_2J^{04}$ where $J^{04}$ is a phenyl group which may optionally have a substituent or a lower alkyl group which may optionally be substituted with a fluorine atom, with a compound of the formula (14):

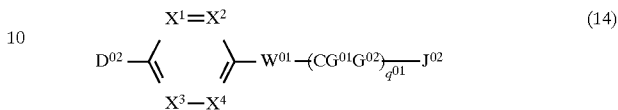
(14)

wherein $W^{01}$, $G^{01}$, $G^{02}$, $G^{03}$, $G^{04}$, Q01 and $J^{02}$ are the same as defined above, and $D^{03}$ represents $L^{02}$ when $Z^{03}$ is $-(CH_2)-$, $-C\equiv C-$, $-CH=CH-$, or $-OCH_2-$; $-OH$ when $Z^{03}$ is $-CH_2O-$, COO-, or $-O-$; $-COOH$ when $Z^{03}$ is $-OCO-$; or $L^{02}$ or $-B(OH)_2$ when $Z^{03}$ is a single bond in which $L^{02}$ is a phenyl group which may optionally have a substituent or a lower alkyl group which may optionally be substituted with a fluorine atom.

The compound of the formula (1) in which $Z^{03}$ is $-CF=CF-$ may be prepared as follows:

When $W^{01}$ is $-CH=CH-$, a sulfonate ester of the formula (22):

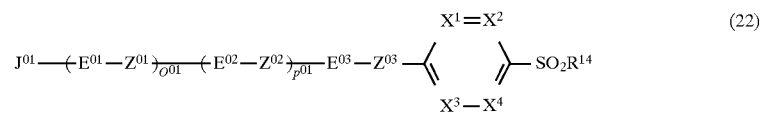
(22)

wherein $J^{01}$, $E^{01}$, $E^{02}$, $E^{03}$, $Z^{01}$, $Z^{02}$, $Z^{03}$, $X^1$, $X^2$, $X^3$, $X^4$, $o^{01}$ and $p^{01}$ are the same as defined above, and $R^{14}$ is a phenyl group which may optionally have a substituent or a lower alkyl group which may optionally be substituted with a fluorine atom is reacted with a boron compound of the formula:

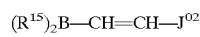

wherein $J^{02}$ is the same as defined above, and $R^{15}$ is a straight, branched or cyclic alkyl or alkoxy group, or a hydroxyl group or when $W^{01}$ is $-C\equiv C-$, the compound of the above formula (22) is reacted with an acetylene compound of the formula:

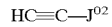

wherein $J^{02}$ is the same as define above.

The above reactions are both performed in the presence of a metal catalyst (e.g. palladium complexes, nickel complexes, rhodium complexes, copper, etc.) and a basic compound (e.g. carbonates and hydroxides of alkali metals, etc.).

The specific examples of the compound (2) are listed below. The specific examples of the compounds (9) to (12) are also included in these examples.

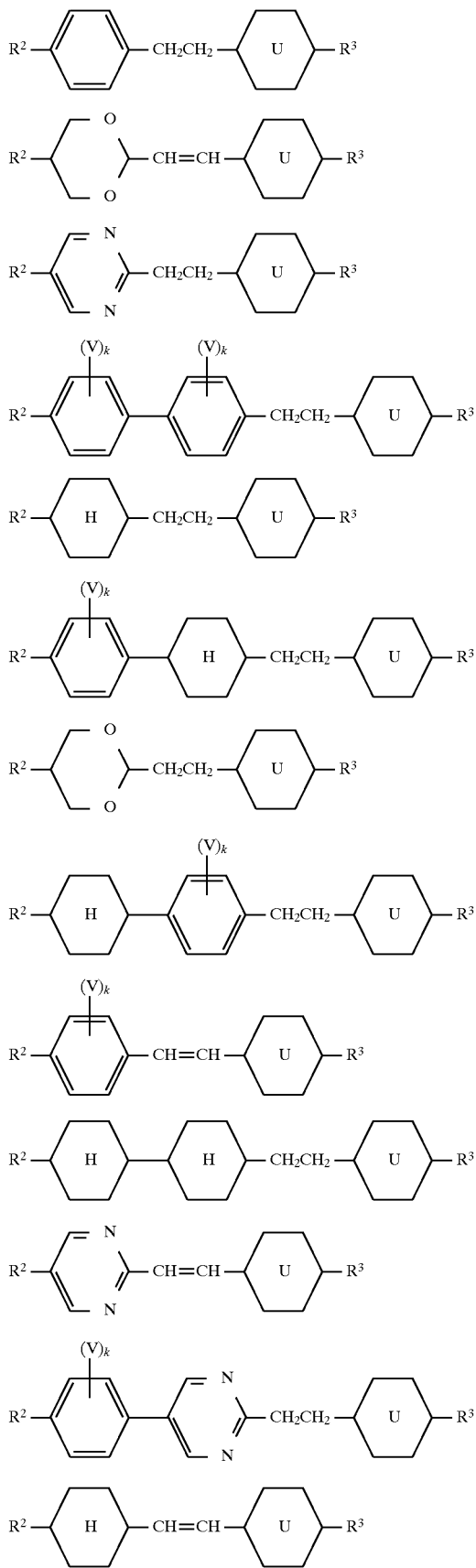

-continued
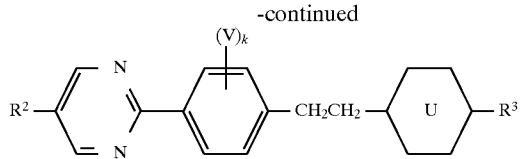
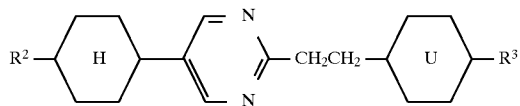
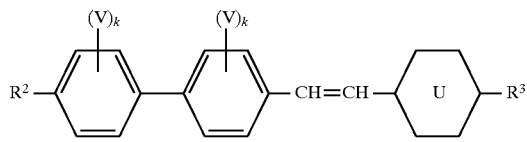
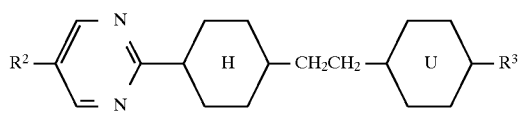
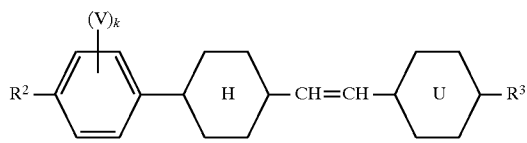
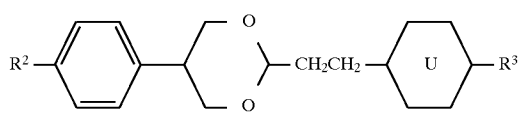
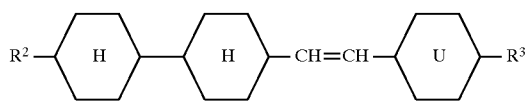
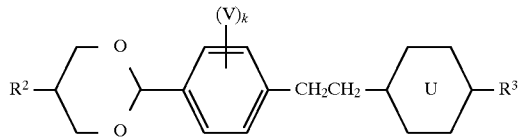
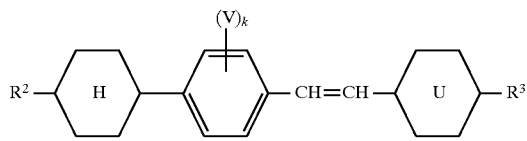
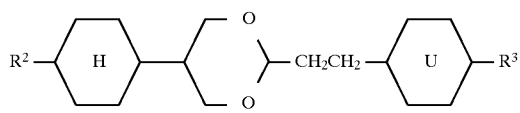
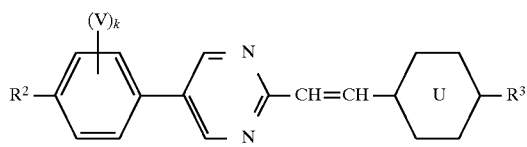
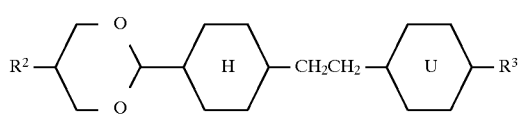

-continued
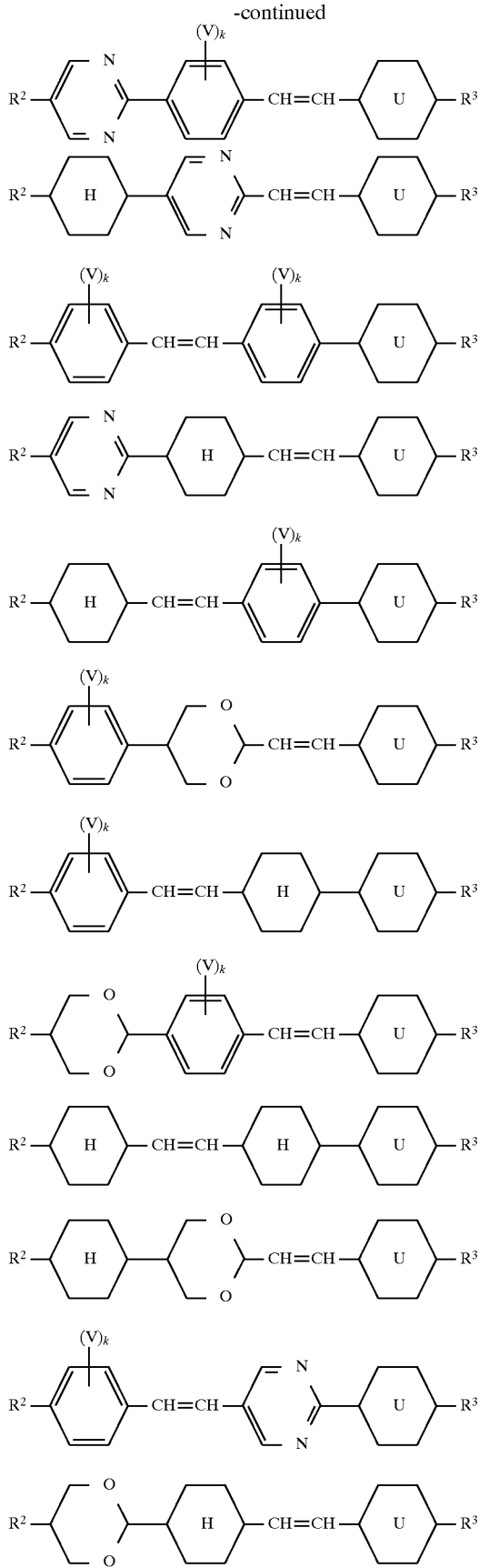

-continued
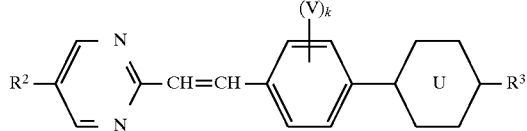
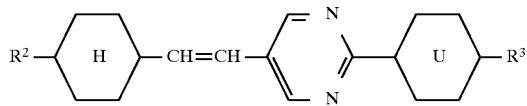
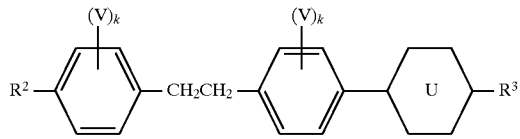
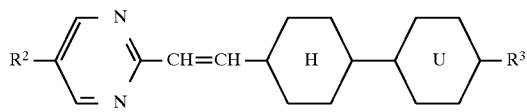
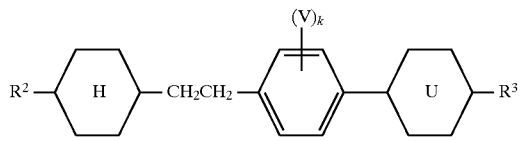
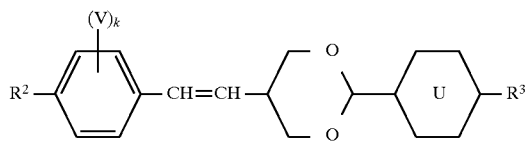
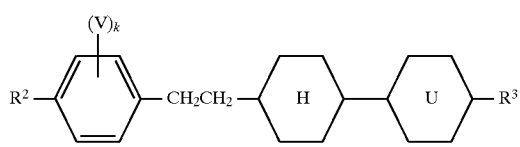
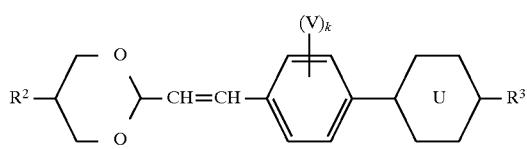
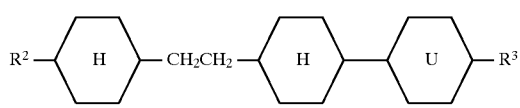
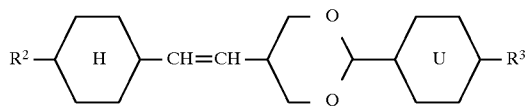
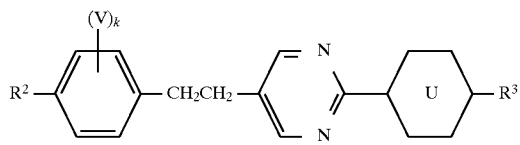
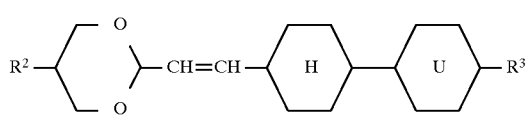

-continued
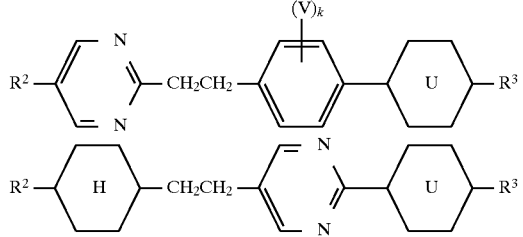
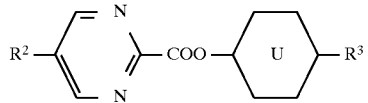
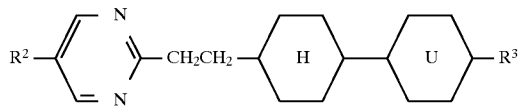
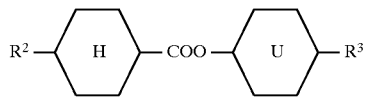
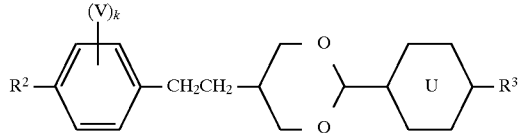
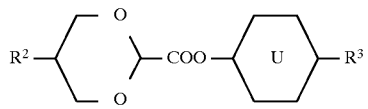
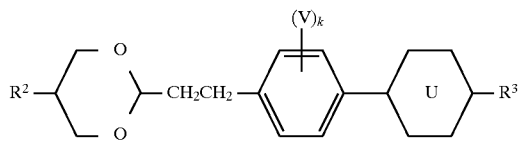
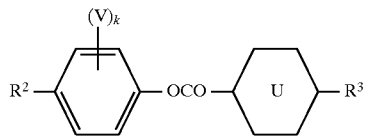
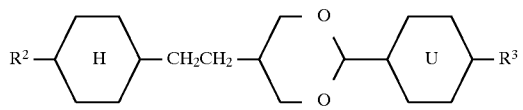
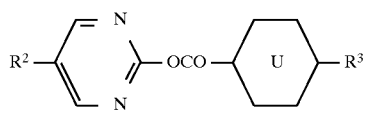
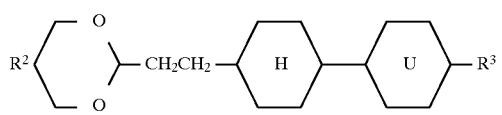
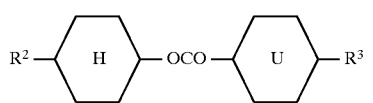

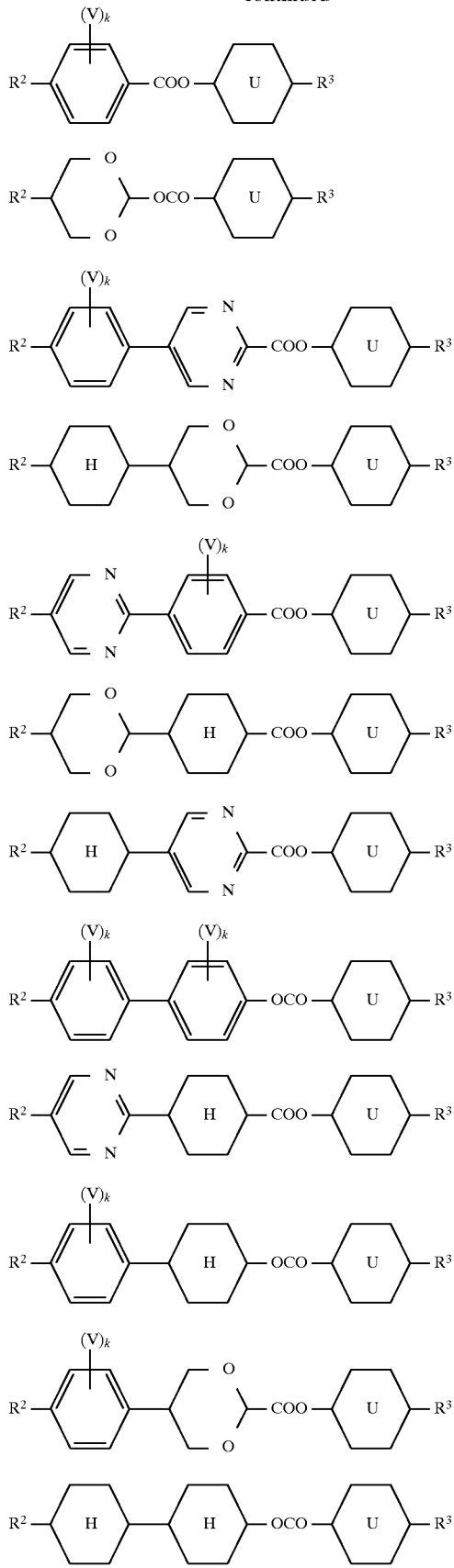

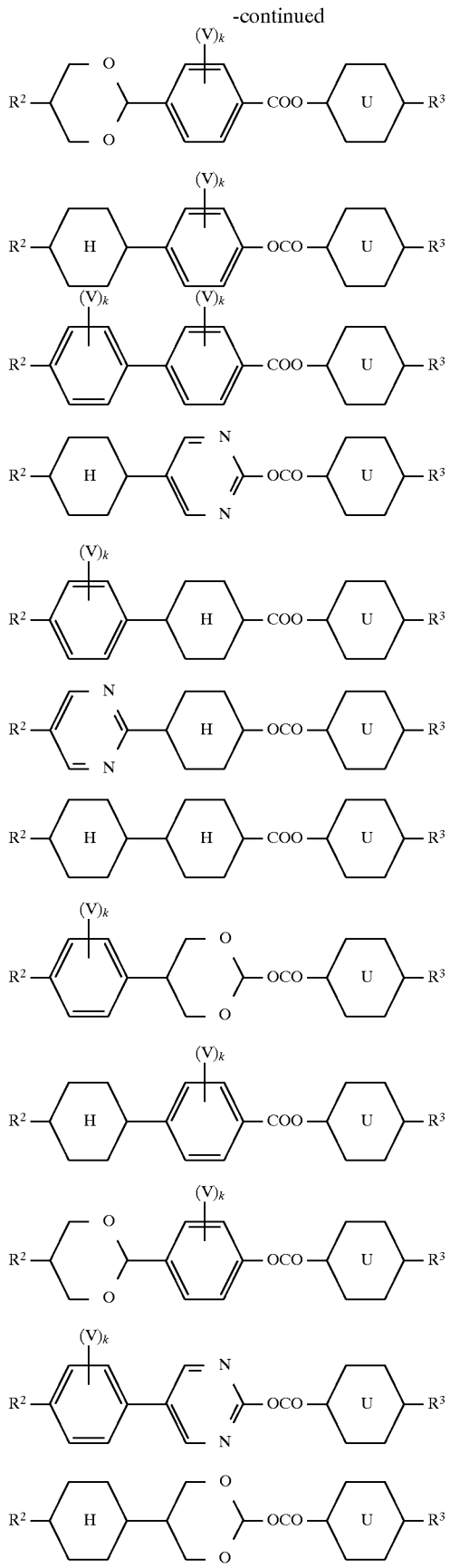

-continued
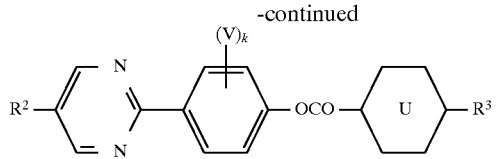
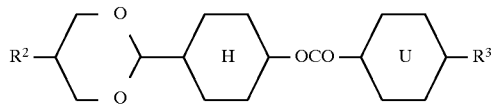
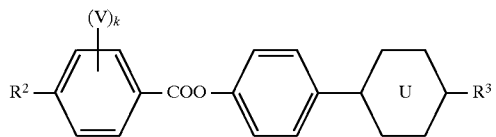
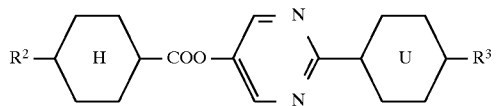
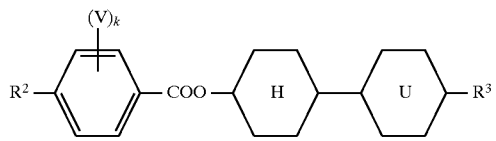
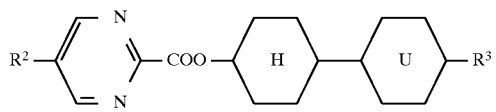
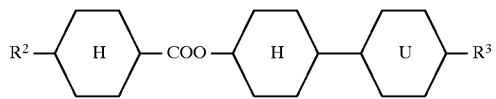
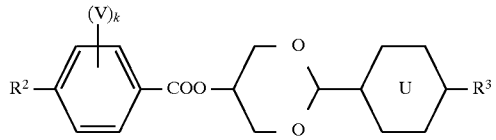
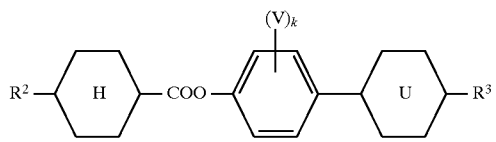
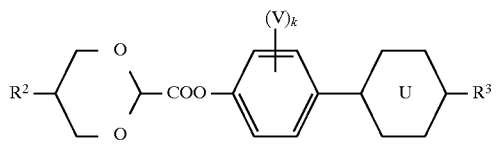
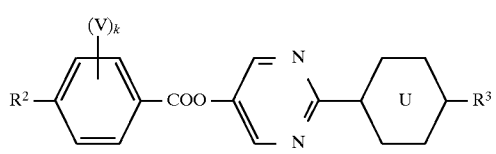
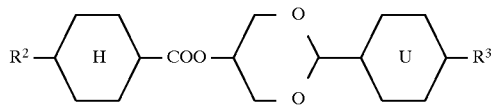

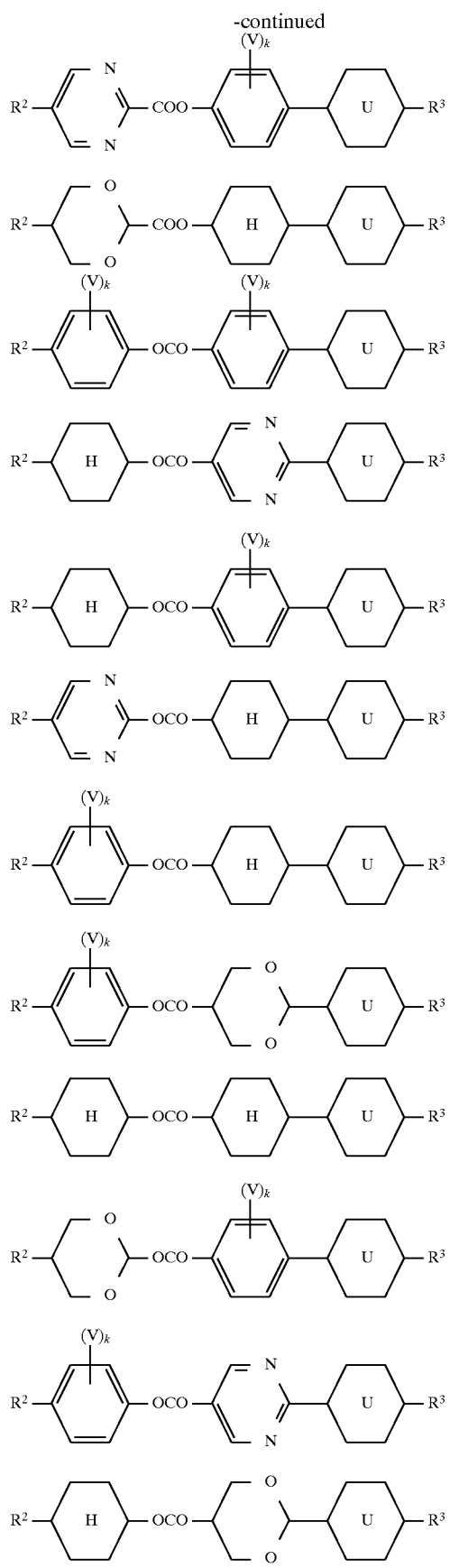

-continued
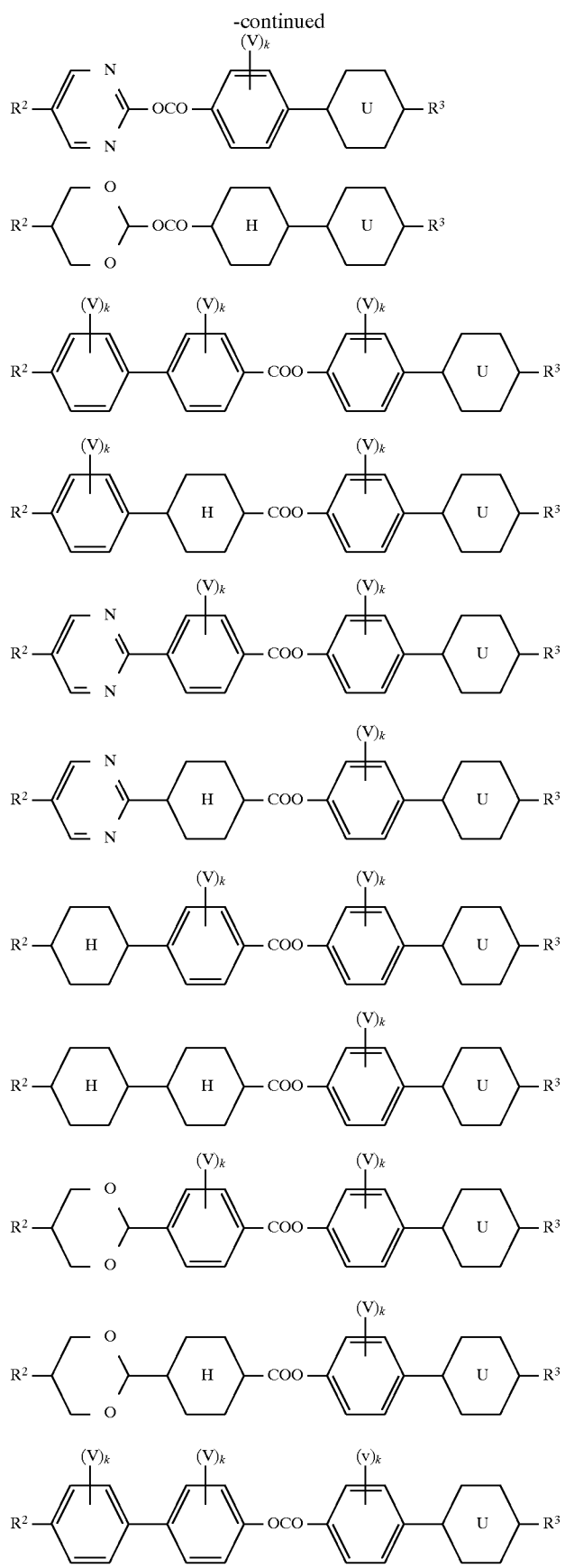

-continued
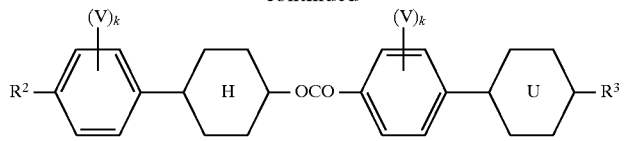
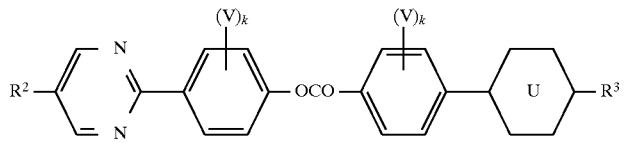
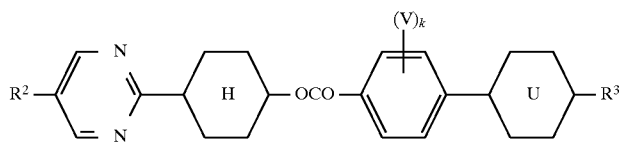
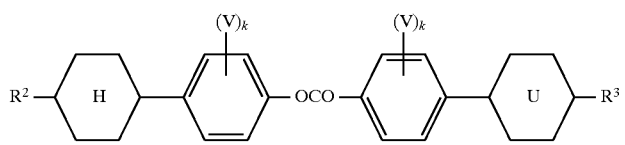
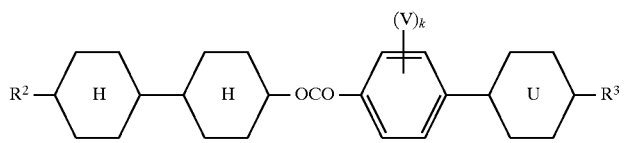
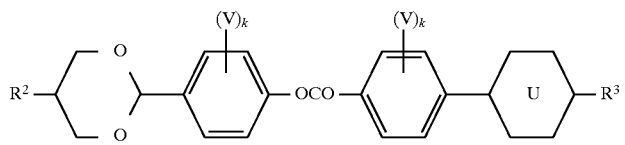
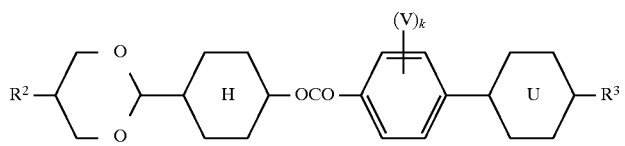
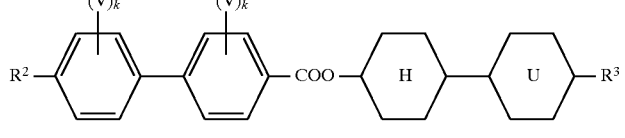
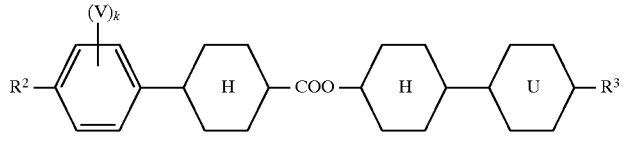
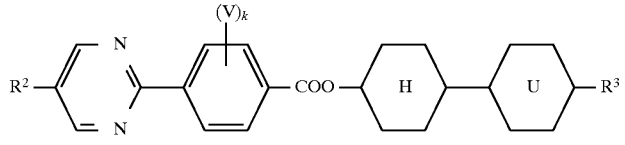
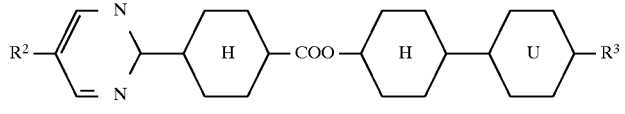

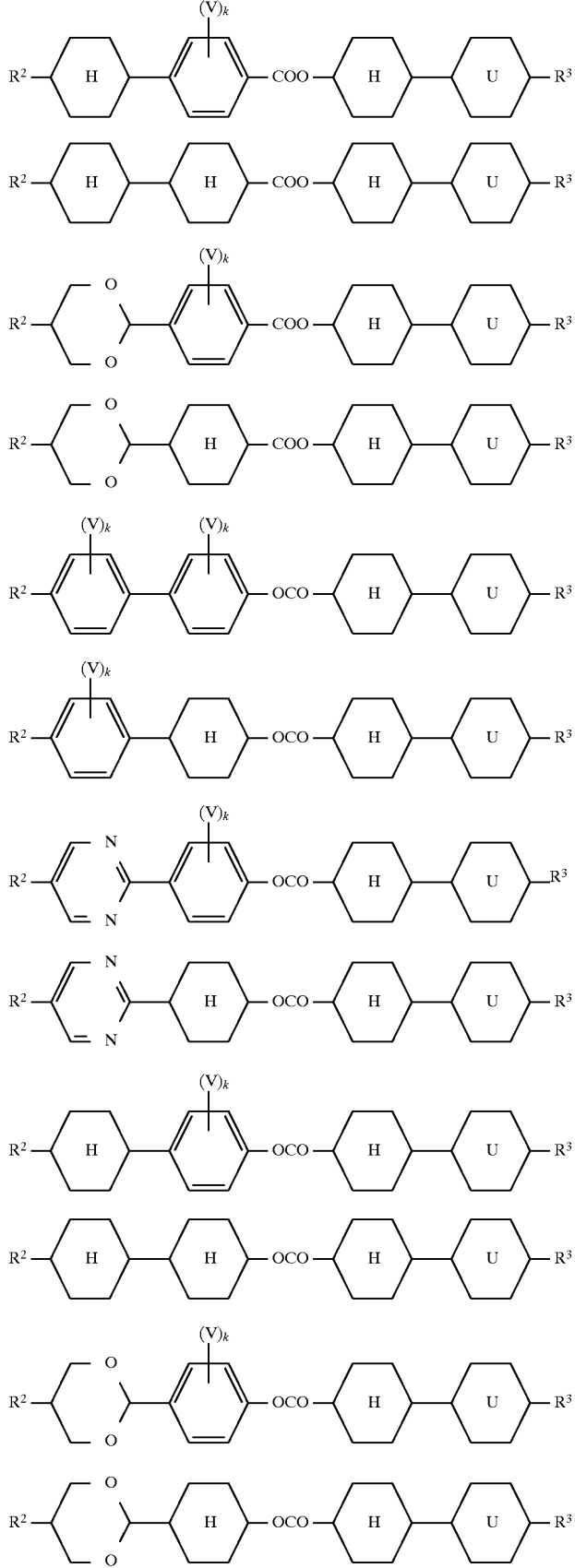

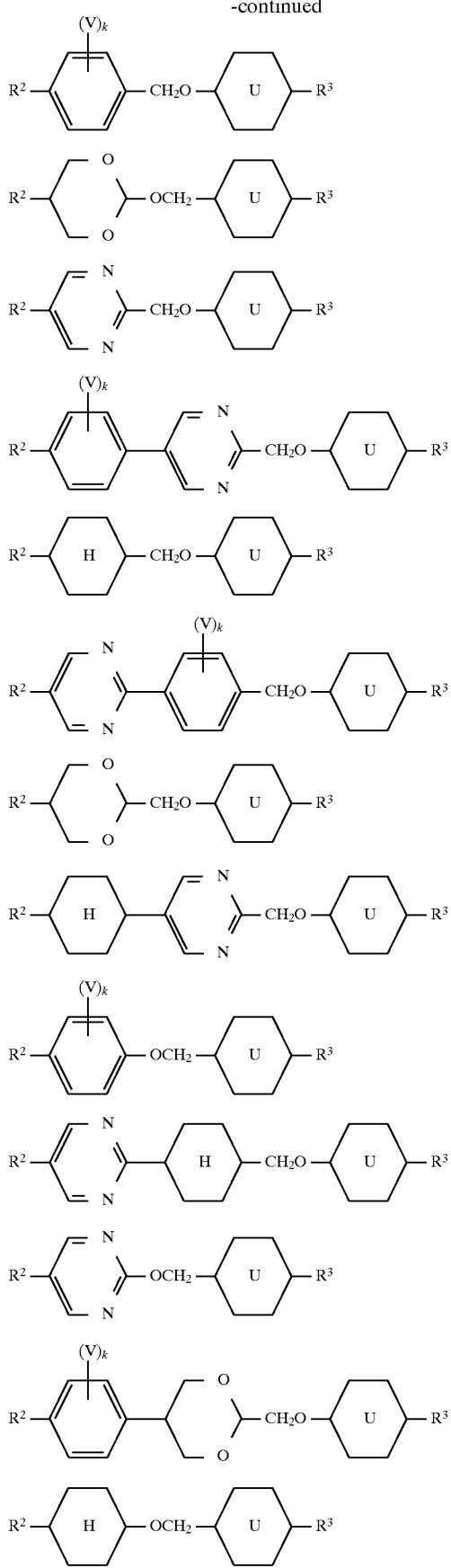

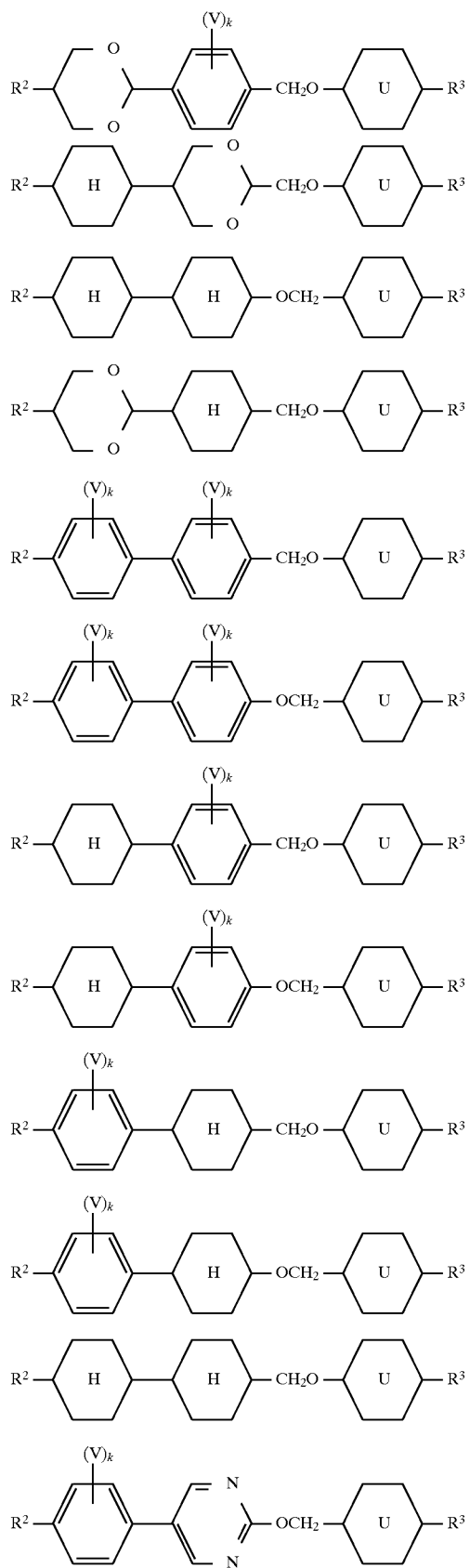

-continued
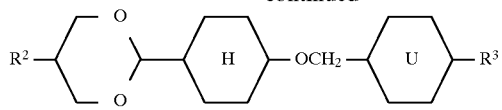
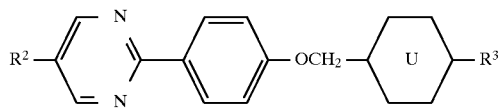
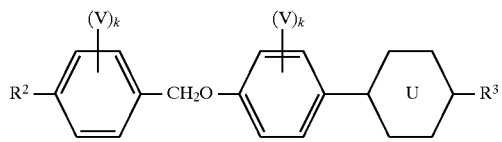
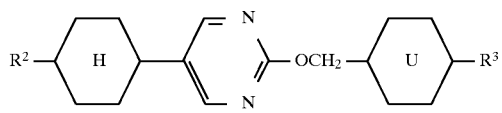
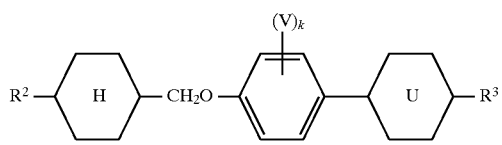
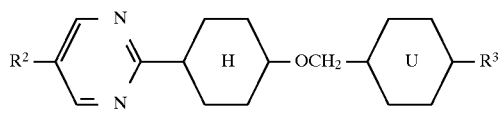
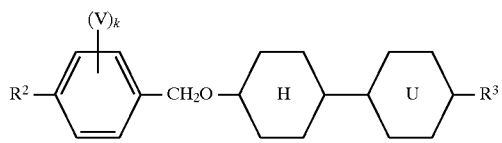
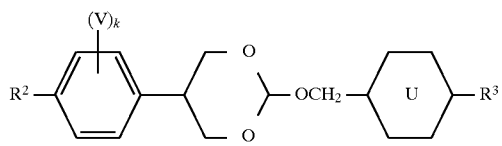
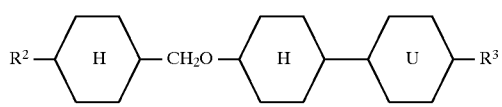
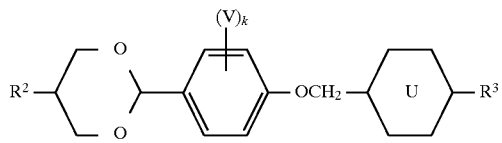
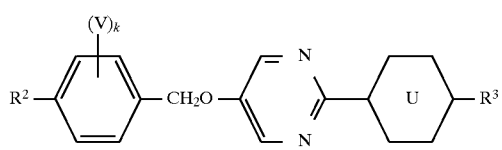
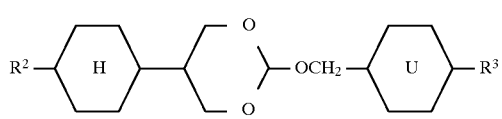

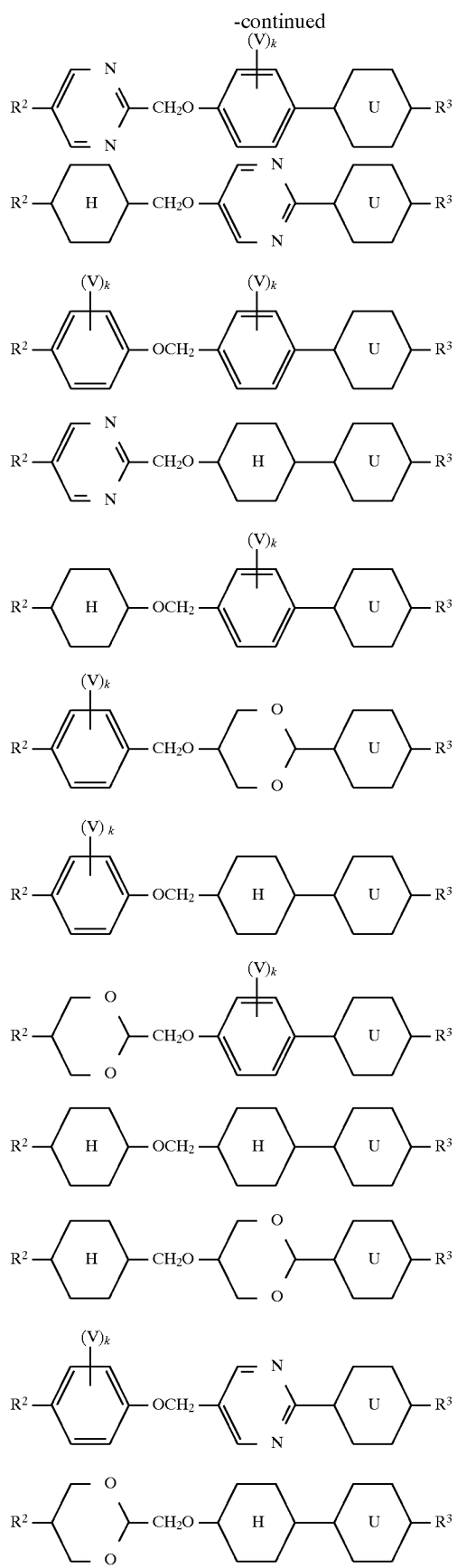

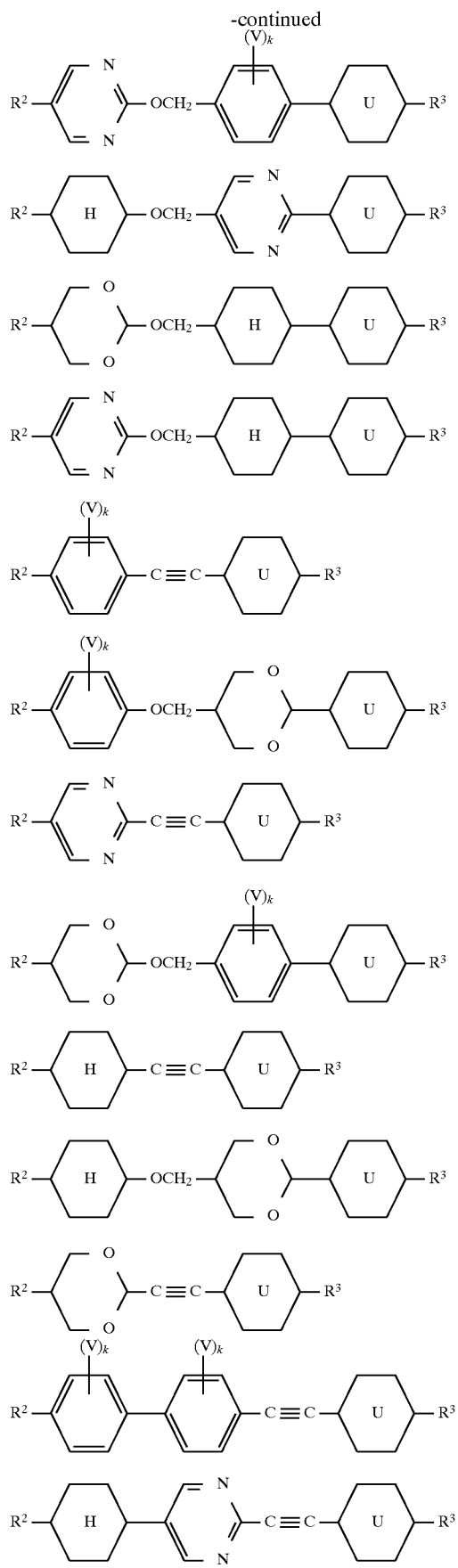

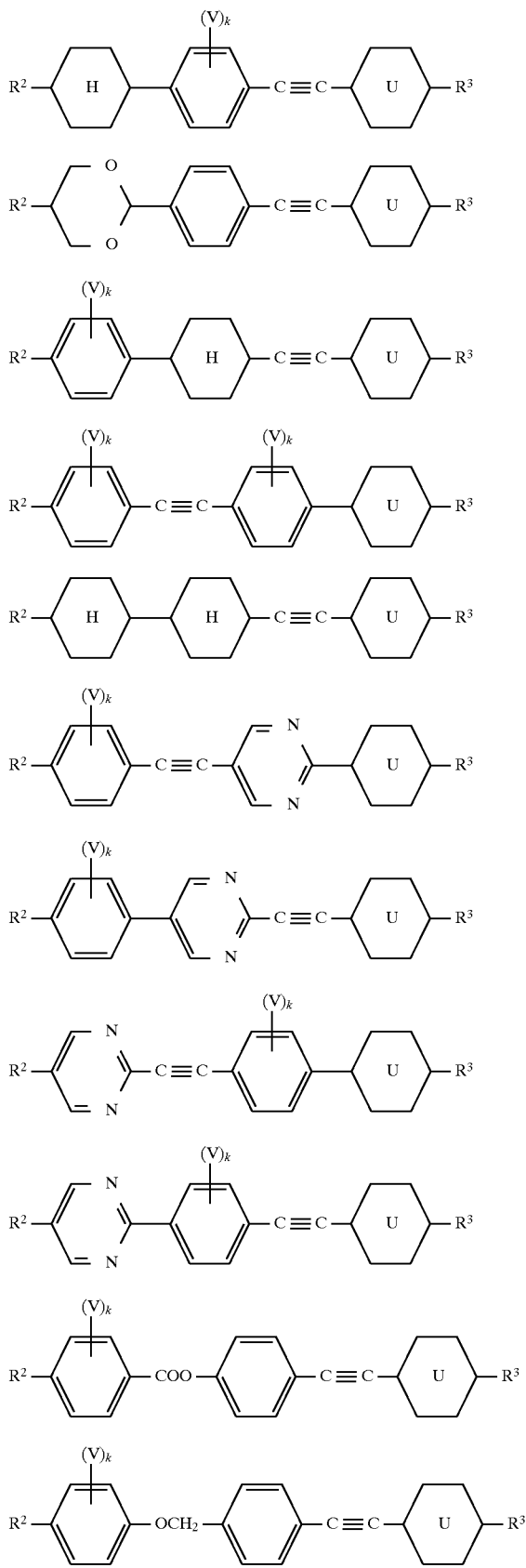

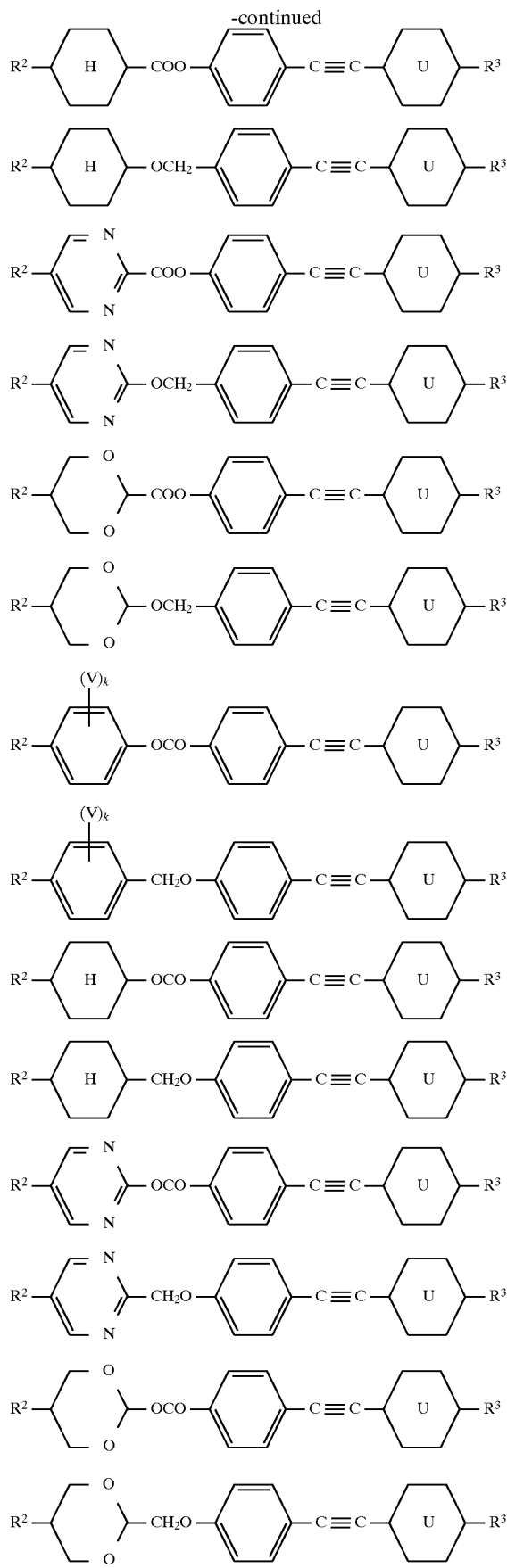

-continued
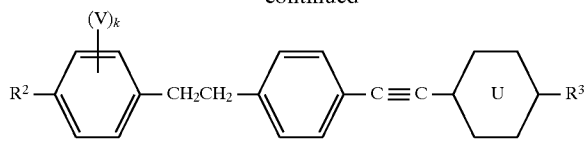
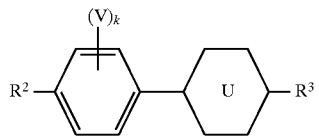
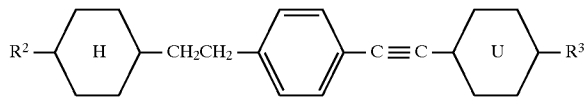
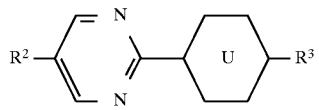
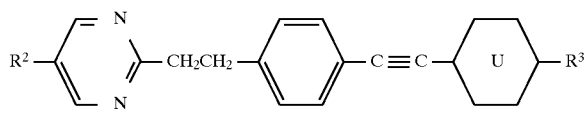
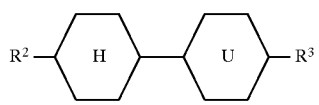
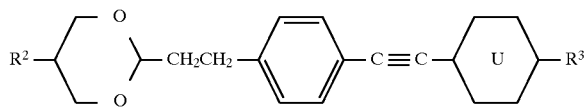
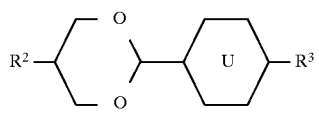
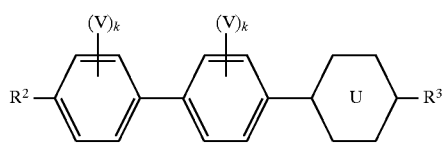
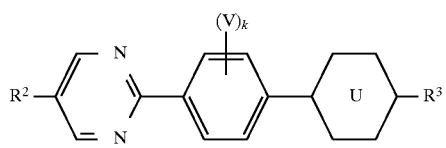
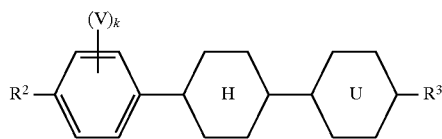
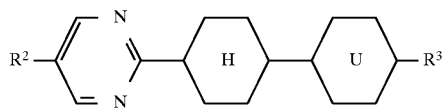

-continued
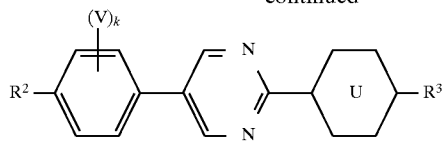
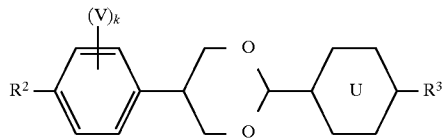
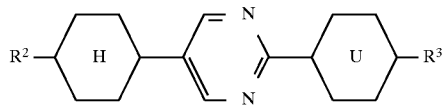
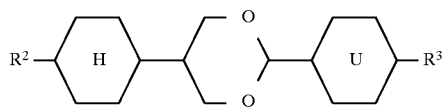
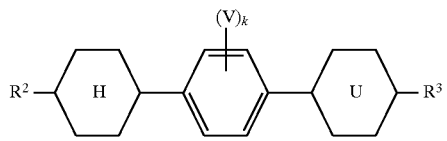
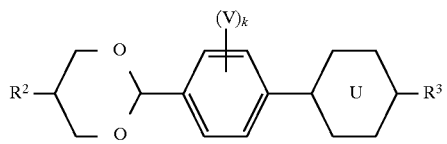
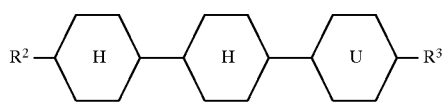
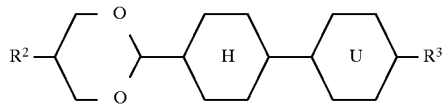
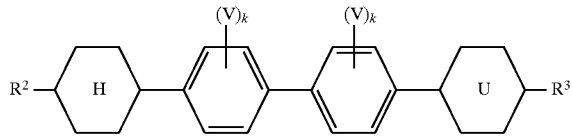
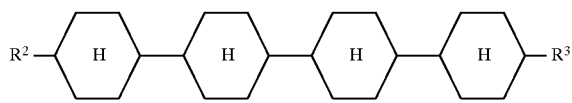
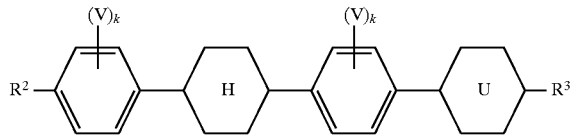
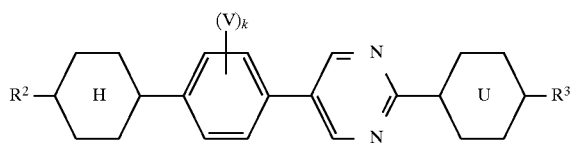

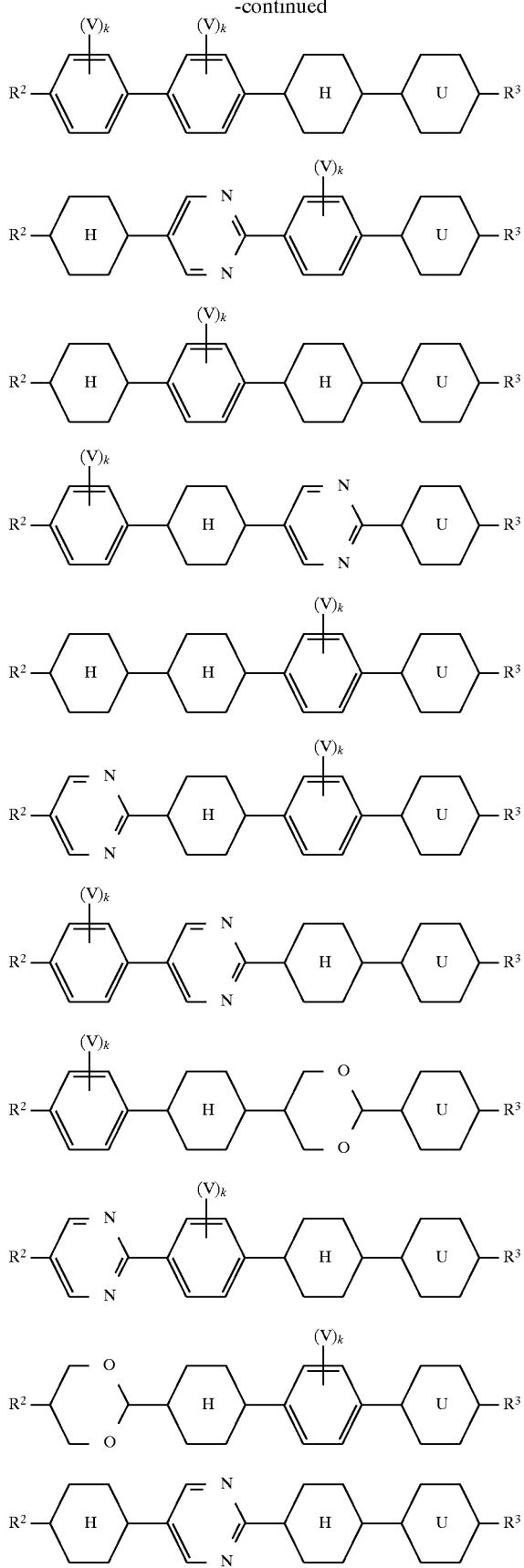

-continued

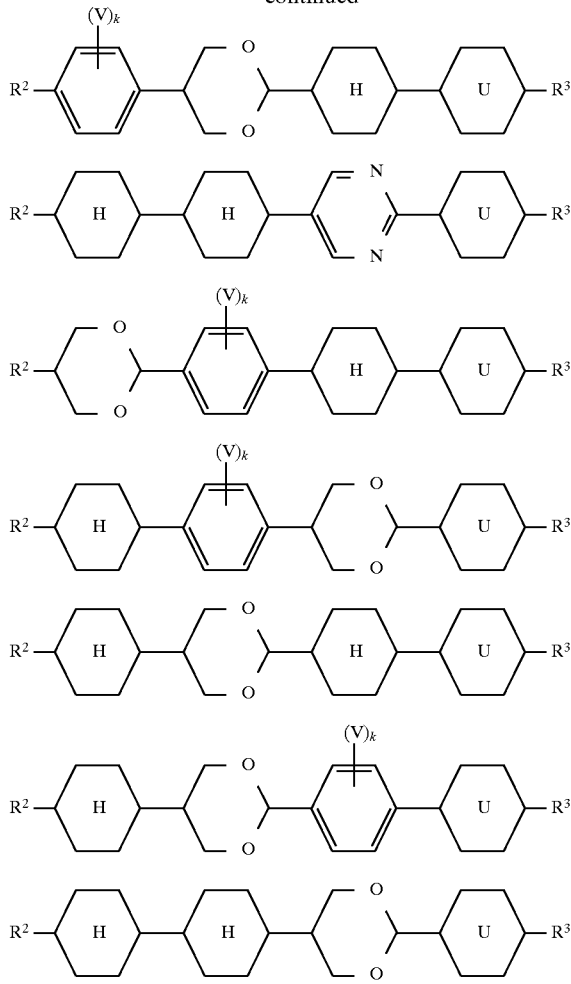

Specific examples of $R^{02}$ are a hydrogen atom, or methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, methoxy, ethoxy, propoxy, butoxy, pentyloxy, hexyloxy, heptyloxy, octyloxy, nonyloxy, decyloxy, undecyloxy, dodecyloxy, vinyloxy, propenyloxy, butenyloxy, pentenyloxy, hexynyloxy, heptenyloxy, octenyloxy, nonenyloxy, decenyloxy, propynyloxy, butynyloxy, pentynyloxy, hexynyloxy, heptynyloxy, octynyloxy, nonynyloxy, decynyloxy, undecynyloxy, dodecynyloxy, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, each of which may be substituted with at least one fluorine atom.

V represents a hydrogen or fluorine atom, and k is an integer of 0 to 3.

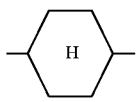

represents 1,4-cyclohexylene. In the above exemplified compounds, the ring U represents 1,4-phenylene, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl or 5,2-dioxanediyl, each of which may be substituted with 1, 2 or 3 fluorine atoms.

Among the above exemplified compounds, the compounds in which the ring U is 1,4-phenylene, 1,4-cyclohexylene, 1,4-cyclohexelene, 4,1-cyclohexelene, 2,5-cyclohexelene, 5,2-cyclohexelene, 3,6-cyclohexelene or 6,3-cyclohexelene, each of which may be substituted with 1, 2 or 3 fluorine atoms are preferred.

Examples of the aromatic ring comprising the ring structure $X^1, X^2, X^3, X^4, Y^1, Y^2, Y^3$ or $Y^4$ in the formulas (3) and (4) are 1,4-phenylene, 1,4-(2-fluoro)phenylene, 1,4-(3-fluoro)phenylene, 1,4-(2,5-difluoro)phenylene, 1,4-(3,6-difluoro)phenylene, 1,4-(2,6-difluoro)phenylene, 1,4-(3,5- difluoro)phenylene, 2,5-pyrimidinediyl, 5,2-dipyrimidinediyl, 2,5-pyridinediyl, 5,2-pyridinediyl, etc.

Specific examples of $R^{04}$ in the formula (3) are methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, each of which may be substituted with at least one fluorine atom.

Specific examples of $A^{01}$ are a hydrogen atom, or methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, propynyl, butynyl, pentynyl, hexynyl, heptynyl, octynyl, nonynyl, decynyl, dodecynyl, methoxy, ethoxy, propoxy, butoxy, pentyloxy, hexyloxy, heptyloxy, octyloxy, nonyloxy, decyloxy, undecyloxy, dodecyloxy, vinyloxy, propenyloxy, butenyloxy, pentenyloxy, hexynyloxy, heptenyloxy, octenyloxy, nonenyloxy, decenyloxy, propynyloxy, butynyloxy, pentynyloxy, hexynyloxy, heptynyloxy, octynyloxy, nonynyloxy, decynyloxy, undecynyloxy, dodecynyloxy, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, 4-methylcyclohexyl, 4-ethylcyclohexyl, 4-propylcyclohexyl, 4-butylcyclohexyl, 4-pentylcyclohexyl, 4-hexylcyclohexyl, 4-heptylcyclohexyl, 4-octylcyclohexyl, 4-nonylcyclohexyl, 4-decylcyclohexyl, 4-propylcyclohexenyl, each of which may be substituted with at least one fluorine atom.

Specific examples of Z are a single bond and —C≡C—.

Specific examples of $A^{02}$ are a fluorine atom, and trifluoromethyl, trifluoromethoxy and cyano groups.

The compounds of the formulas (3) and (4) may be prepared according to the methods disclosed in JP-A-7-330636 and JP-A-8-99917.

Preferred examples of the compound of the formula (5) are those of the compounds (5) in which $A^{03}$ is the same as the specific examples for $A^{01}$ in the formula (3) and $A^{02}$ in the formula (4), and the aromatic ring comprising the ring structures $X^1$, $X^2$, $X^3$, $X^4$, $Y^1$, $Y^2$, $Y^3$ and $Y^4$, $R^{04}$ and $Z^{07}$ are the same as the specific examples for the formula (3).

The compound of the formula (5) can be prepared by reacting a compound of the formula (15):

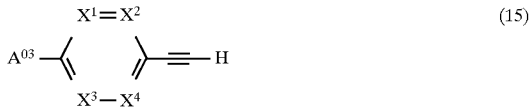

(15)

wherein $A^{03}$, $X^1$, $X^2$, $X^3$ and $X^4$ are the same as defined above, with a compound of the formula (16):

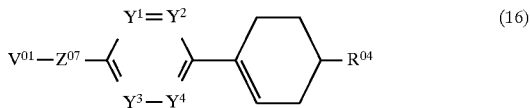

(16)

wherein $R^{04}$, $Z^{07}$, $Y^1$, $Y^2$, $Y^3$ and $Y^4$ are the same as defined above, and $V^{01}$ is a halogen atom or —$OSO_2R^{10}$ in which $R^{10}$ is a phenyl group which may optionally have a substituent or a lower alkyl group which may optionally be substituted with a fluorine atom, in the presence of a metal catalyst (e.g. palladium complexes, nickel complexes, rhodium complexes, copper, etc.) and a basic compound (e.g. carbonates and hydroxides of alkali metals, etc.).

The compound of the formula (6) can be prepared by reacting a compound of the formula (17):

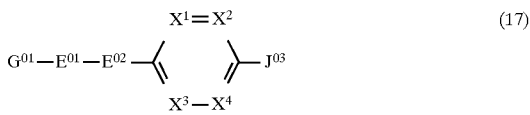

(17)

wherein $G^{01}$, $E^{01}$, $E^{02}$, $X^1$, $X^2$, $X^3$ and $X^4$ are the same as defined above, and J03 is a halogen atom or —$SO_2R^{11}$ in which $R^{11}$ is a phenyl group which may optionally have a substituent or a lower alkyl group which may optionally be substituted with a fluorine atom, with a compound of the formula (18):

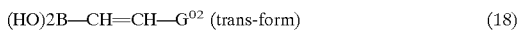

(HO)2B—CH=CH—$G^{02}$ (trans-form) (18)

wherein $G^{02}$ is the same as defined above, in the presence of a metal catalyst (e.g. palladium complexes, nickel complexes, rhodium complexes, copper, etc.) and a basic compound (e.g. carbonates and hydroxides of alkali metals, etc.).

Specific examples of $G^{01}$ in the formula (6) are methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, propynyl, butynyl, pentynyl, hexynyl, heptynyl, octynyl, nonynyl, decynyl, dodecynyl, methoxy, ethoxy, propoxy, butoxy, pentyloxy, hexyloxy, heptyloxy, octyloxy, nonyloxy, decyloxy, undecyloxy, dodecyloxy, vinyloxy, propenyloxy, butenyloxy, pentenyloxy, hexynyloxy, heptenyloxy octenyloxy, nonenyloxy, decenyloxy, propynyloxy, butynyloxy, pentynyloxy, hexynyloxy, heptynyloxy, octynyloxy, nonynyloxy, decynyloxy, undecynyloxy, dodecynyloxy, trifluoromethyl, trifluoromethoxy, cyano, a hydrogen or fluorine atom, and the like. Specific examples of $J^{02}$ are methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, each of which may be substituted with at least one fluorine atom.

Examples of the aromatic ring comprising the ring structure $X^1$, $X^2$, $X^3$ or $X^4$ in the formula (6) are 1,4-phenylene, 1,4-(2-fluoro)phenylene, 1,4-(3-fluoro)phenylene, 1,4-(2,5-difluoro)-phenylene, 1,4-(3,6-difluoro)phenylene, 1,4-(2,6-difluoro)-phenylene, 1,4-(3,5-difluoro)phenylene, 2,5-pyrimidinediyl, 5,2-dipyrimidinediyl, 2,5-pyridinediyl, 5,2-pyridinediyl, etc.

Specific examples of the compound of the formula (7) are as follows:

1-(4-fluorocyclohexyl)-4-propenylbenzene,
1-(1-trans-butenyl)-4-(4-fluorocyclohexyl)benzene,
1-(1-trans-pentenyl)-4-(4-fluorocyclohexyl)benzene,
1-(1-trans-hexenyl)-4-(4-fluorocyclohexyl)benzene,
1-(1-trans-heptenyl)-4-(4-fluorocyclohexyl)benzene,
1-(1-trans-octenyl)-4-(4-fluorocyclohexyl)benzene,
1-(1-trans-nonenyl)-4-(4-fluorocyclohexyl)benzene,
1-(1-trans-decenyl)-4-(4-fluorocyclohexyl)benzene,
1-(1-trans-undecenyl)-4-(4-fluorocyclohexyl)benzene,
1-(1-trans-dodecenyl)-4-(4-fluorocyclohexyl)benzene,
1-(4,4-difluorocyclohexyl)-4-propenylbenzene,
1-(1-trans-butenyl)-4-(4,4-difluorocyclohexyl)benzene,
1-(1-trans-pentenyl)-4-(4,4-difluorocyclohexyl)-benzene,
1-(1-trans-hexenyl)-4-(4,4-difluorocyclohexyl)benzene,
1-(1-trans-heptenyl)-4-(4,4-difluorocyclohexyl)-benzene,
1-(1-trans-octenyl)-4-(4,4-difluorocyclohexyl)benzene,
1-(1-trans-nonenyl)-4-(4,4-difluorocyclohexyl)benzene,
1-(1-trans-decenyl)-4-(4,4-difluorocyclohexyl)benzene,
1-(1-trans-undecenyl)-4-(4,4-difluorocyclohexyl)-benzene,
1-(1-trans-dodecenyl)-4-(4,4-difluorocyclohexyl)-benzene,
4'-(4-fluorocyclohexyl)-4-propenylbiphenyl,
4-(1-trans-butenyl)-4'-(4-fluorocyclohexyl)biphenyl,
4-(1-trans-pentenyl)-4'-(4-fluorocyclohexyl)biphenyl,
4-(1-trans-hexenyl)-4'-(4-fluorocyclohexyl)biphenyl,
4-(1-trans-heptenyl)-4'-(4-fluorocyclohexyl)biphenyl,
4-(1-trans-octenyl)-4'-(4-fluorocyclohexyl)biphenyl,
4-(1-trans-nonenyl)-4'-(4-fluorocyclohexyl)biphenyl,
4-(1-trans-decenyl)-4'-(4-fluorocyclohexyl)biphenyl,
4-(1-trans-undecenyl)-4'-(4-fluorocyclohexyl)biphenyl,
4-(1-trans-dodecenyl)-4'-(4-fluorocyclohexyl)biphenyl,
4'-(4,4-difluorocyclohexyl)-4-propenylbiphenyl,
4-(1-trans-butenyl)-4'-(4,4-difluorocyclohexyl)-biphenyl,
4-(1-trans-pentenyl)-4'-(4,4-difluorocyclohexyl)-biphenyl,
4-(1-trans-hexenyl)-4'-(4,4-difluorocyclohexyl)-biphenyl,
4-(1-trans-heptenyl)-4'-(4,4-difluorocyclohexyl)-biphenyl,
4-(1-trans-octenyl)-4'-(4,4-difluorocyclohexyl)-biphenyl,
4-(1-trans-nonenyl)-4'-(4,4-difluorocyclohexyl)-biphenyl,
4-(1-trans-decenyl)-4'-(4,4-difluorocyclohexyl)-biphenyl,
4-(1-trans-undecenyl)-4'-(4,4-difluorocyclohexyl)-biphenyl,
4-(1-trans-dodecenyl)-4'-(4,4-difluorocyclohexyl)-biphenyl,
4-propenyl-4'-(4-fluorocyclohexyl)-2,3-difluoro-biphenyl,
4-(1-trans-butenyl)-4'-(4-fluorocyclohexyl)-2,3-difluorobiphenyl,
4-(1-trans-pentenyl)-4'-(4-fluorocyclohexyl)-2,3-difluorobiphenyl,
4-(1-trans-hexenyl)-4'-(4-fluorocyclohexyl)-2,3-difluorobiphenyl,
4-(1-trans-heptenyl)-4'-(4-fluorocyclohexyl)-2,3-difluorobiphenyl,
4-(1-trans-octenyl)-4'-(4-fluorocyclohexyl)-2,3-difluorobiphenyl,
4-(1-trans-nonenyl)-4'-(4-fluorocyclohexyl)-2,3-difluorobiphenyl,
4-(1-trans-decenyl)-4'-(4-fluorocyclohexyl)-2,3-difluorobiphenyl,
4-(1-trans-undecenyl)-4'-(4-fluorocyclohexyl)-2,3-difluorobiphenyl,
4-(1-trans-dodecenyl)-4'-(4-fluorocyclohexyl)-2,3-difluorobiphenyl,
4-propenyl-4'-(4,4-difluorocyclohexyl)-2,3-difluorobiphenyl,
4-(1-trans-butenyl)-4'-(4,4-difluorocyclohexyl)-2,3-difluorobiphenyl,
4-(1-trans-pentenyl)-4'-(4,4-difluorocyclohexyl)-2,3-difluorobiphenyl,
4-(1-trans-hexenyl)-4'-(4,4-difluorocyclohexyl)-2,3-difluorobiphenyl,
4-(1-trans-heptenyl)-4'-(4,4-difluorocyclohexyl)-2,3-difluorobiphenyl,
4-(1-trans-octenyl)-4'-(4,4-difluorocyclohexyl)-2,3-difluorobiphenyl,
4-(1-trans-nonenyl)-4'-(4,4-difluorocyclohexyl)-2,3-difluorobiphenyl,
4-(1-trans-decenyl)-4'-(4,4-difluorocyclohexyl)-2,3-difluorobiphenyl,
4-(1-trans-undecenyl)-4'-(4,4-difluorocyclohexyl)-2,3-difluorobiphenyl,
4-(1-trans-dodecynyl)-4'-(4,4-difluorocyclohexyl)-2,3-difluorobiphenyl, the above compounds in which each of "2,3-difluoro" is changed to "2-fluoro" or "3-fluoro"; and/or "propenyl", "1-trans-butenyl", "1-trans-pentenyl", "1-trans-hexenyl", "1-trans-heptenyl", "1-trans-octenyl", "1-trans-nonenyl", "1-trans-decenyl", "1-trans-undecenyl" and "1-trans-dodecynyl" are changed to "1-butynyl", "1-pentynyl", "1-hexynyl", "1-heptynyl", "1-octynyl", "1-nonylyl", "1-decynyl", "1-undecynyl" and "1-dodecynyl", respectively;

Further examples of the compound of the formula (7) are as follows:

1-(4-fluorocyclohexyl)propylbenzene, 1-butyl-4-(4-fluorocyclohexyl)benzene,
1-pentyl-4-(4-fluorocyclohexyl)benzene,
1-hexyl-4-(4-fluorocyclohexyl)benzene,
1-heptyl-4-(4-fluorocyclohexyl)benzene,
1-octyl-4-(4-fluorocyclohexyl)benzene,
1-nonyl-4-(4-fluorocyclohexyl)benzene,
1-decyl-4-(4-fluorocyclohexyl)benzene,
1-undecyl-4-(4-fluorocyclohexyl)benzene,
1-dodecyl-4-(4-fluorocyclohexyl)benzene,
4'-(4-fluorocyclohexyl)-4-propylbiphenyl,
4-butyl-4'-(4-fluorocyclohexyl)biphenyl,
4-pentyl-4'-(4-fluorocyclohexyl)biphenyl,
4-hexyl-4'-(4-fluorocyclohexyl)biphenyl,
4-heptyl-4'-(4-fluorocyclohexyl)biphenyl,
4-octyl-4'-(4-fluorocyclohexyl)biphenyl,
4-nonyl-4'-(4-fluorocyclohexyl)biphenyl,
4-decyl-4'-(4-fluorocyclohexyl)biphenyl,
4-undecyl-4'-(4-fluorocyclohexyl)biphenyl,
4-dodecyl-4'-(4-fluorocyclohexyl)biphenyl,
4-propyl-4'-(4-fluorocyclohexyl)-2,3-difluorobiphenyl,
4-butyl-4'-(4-fluorocyclohexyl)-2,3-difluorobiphenyl,
4-pentyl-4'-(4-fluorocyclohexyl)-2,3-difluorobiphenyl,
4-hexyl-4'-(4-fluorocyclohexyl)-2,3-difluorobiphenyl,
4-heptyl-4'-(4-fluorocyclohexyl)-2,3-difluorobiphenyl,
4-octyl-4'-(4-fluorocyclohexyl)-2,3-difluorobiphenyl,
4-nonyl-4'-(4-fluorocyclohexyl)-2,3-difluorobiphenyl,
4-decyl-4'-(4-fluorocyclohexyl)-2,3-difluorobiphenyl,
4-undecyl-4'-(4-fluorocyclohexyl)-2,3-difluorobiphenyl,
4-dodecyl-4'-(4-fluorocyclohexyl)-2,3-difluorobiphenyl,
the above compounds in which each of "2,3-difluoro" is changed to "2-fluoro" or "3-fluoro".

The compound of the formula (7) in which X is transform —CH=CH— can be prepared by reacting a sulfonate ester of the formula (19):

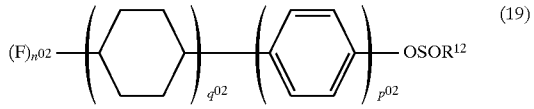

(19)

wherein $n^{02}$, $p^{02}$ and $q^{02}$ are the same as defined above, and $R^{12}$ is a phenyl group which may have a phenyl group which may optionally have a substituent or a lower alkyl group which may optionally be substituted with a fluorine atom, with a boron compound of the formula (20):

$(R^{13})_2B$—CH=CH—$R^{05}$ (trans-form)  (20)

wherein $R^{05}$ is the same as defined above, and $R^{13}$ is a straight, branched or cyclic alkyl or alkoxy group, or a hydroxyl group, or two $R^{13}$ groups are bonded to form a ring, or $(R^{13})_2$ represents a benzoxy group, or the compound of the formula (7) in which X is —C≡C— can be prepared by reacting the compound of the above formula (19) with an acetylene compound of the formula (21):

HC≡C—$R^{05}$  (21)

wherein $R^{05}$ is the same as define above are reacted.

The above reactions are both performed in the presence of a metal catalyst (e.g. palladium complexes, nickel complexes, rhodium complexes, copper, etc.) and a basic compound (e.g. carbonates and hydroxides of alkali metals, etc.).

Each of the liquid crystal mixture of the present invention may contain at least one chiral compound as a twisting agent. A kind of the chiral compound is not limited, and preferred examples thereof are as follows (* indicating an asymmetric carbon atom):

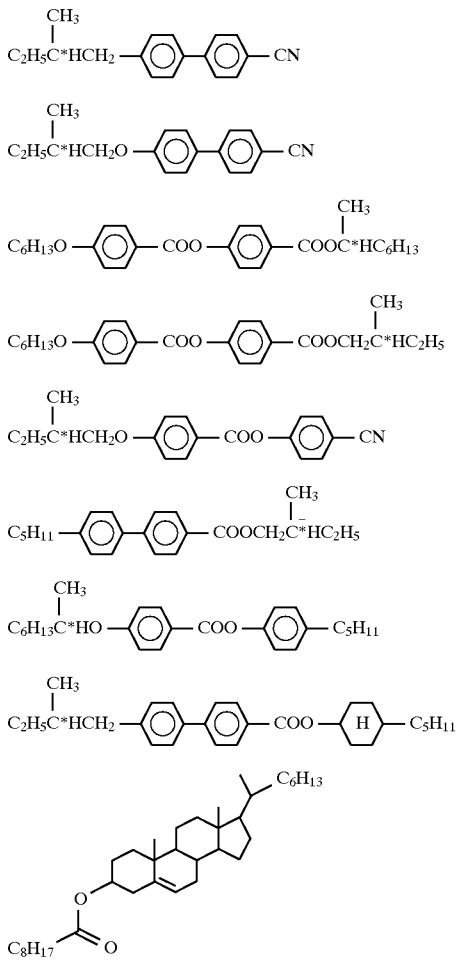

EXAMPLES

The present invention will be illustrated by the following Examples, which do not limit the scope of the present invention in any way.

The properties of the liquid crystal mixture are measured by the following methods:

Upper and lower limit temperatures (° C.) of a nematic phase of the liquid crystal mixture are obtained by observing, with a polarizing microscope, a clearing point and a melting point, respecrtively with raising the temperature.

Birefringence (Δn) of a liquid crystal mixture is determined by measuring a retardation by the Senarmont method using an Abbe refractometer at a wavelength of 589 nm.

A viscosity (η) of a liquid crystal mixture is measured using a falling ball viscometer (AMV-200 manufactured by Anton PAAR).

A responsiveness parameter is expressed by $\eta/\Delta n^2$.

A threshold voltage is obtained by measuring an electrostatic capacity as follows:

An amount of a liquid crystal mixture is placed in a homogeneously orientated cell having a pair of transparent electrodes, and an electrostatic capacity is measured while applying an voltage on the cell. The electrostatic capacities at the applied voltages of 0.4 and 20 V are designated as $C_{0.4}$ and $C_{20}$, respectively. A relationship curve between the applied voltage and the electrostatic capacity is drawn in the region in which the electrostatic capacity is larger than the value $[C_{0.4}+(C_{20}-C_{0.4})/100]$. Then, the curve is extrapolated to the electrostatic capacity of $C_{0.4}$, and the voltage at the extrapolated point is the threshold voltage.

Example 1

As compounds of the formula (2), the compounds (2-1), (2-2) and (2-3) were mixed in the following ratio to prepare Mixture

| Components of Mixture 1 | | Mole % |
|---|---|---|
| Compound (2-1) | $C_5H_{11}$—⬡—⬢—CN | 52.2 |
| Compound (2-2) | $C_5H_{11}$—⬡—⬢—CN | 26.6 |
| Compound (2-3) | $C_7H_{15}$—⬡—COO—⬢—CN | 21.2 |

To Mixture 1, the following compound (1-1), which is an example of the compound of the formula (1), was added in the following ratio to prepare Mixture A.

| Components of Mixture A | | Mole % |
|---|---|---|
| Mixture 1 | | 86.5 |
| Compound (1-1) | $C_3H_7$—⬢—≡—⬢—C(F)=$C_3H_7$ | 13.5 |

The birefringences ($\Delta n$), upper limit temperatures for nematic phase and responsiveness parameters of Mixtures 1 and A are shown in Table 1.

TABLE 1

Birefringences ($\Delta n$), Upper limit temperatures of nematic phase and Responsiveness parameters

| | Mixture 1 | Mixture A |
|---|---|---|
| $\Delta n$ | 0.107 | 0.124 |
| Upper limit temperature of nematic phase (°C.) | 55.5 | 56.0 |
| Responsiveness parameter (Pas) | 3.71 | 3.05 |

As seen from the results in Table 1, Liquid crystal mixture A of the present invention had the larger birefringence, higher upper limit temperature of nematic phase, and smaller responsiveness parameter than the conventional liquid crystal mixture (Mixture 1).

Example 2

To Mixture 1 prepared in Example 1, the following compound (1-2), which is an example of the compound of the formula (1), was added in the following ratio to prepare Mixture B.

| Components of Mixture B | Mole % |
|---|---|
| Mixture 1 | 89.7 |
| Compound (1-2) | 10.3 |

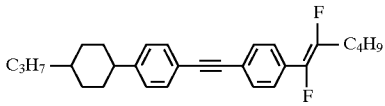

The birefringences ($\Delta n$), upper limit temperatures of nematic phase and responsiveness parameters of Mixtures 1 and B are shown in Table 2.

TABLE 2

Birefringences ($\Delta n$), Upper limit temperatures of nematic phase and Responsiveness parameters

| | Mixture 1 | Mixture B |
|---|---|---|
| $\Delta n$ | 0.107 | 0.130 |
| Upper limit temperature of nematic phase (°C.) | 55.5 | 72.5 |
| Responsiveness parameter (Pas) | 3.71 | 3.69 |

As seen from the results in Table 2, Liquid crystal mixture B of the present invention had the larger birefringence, higher upper limit temperature of nematic phase, and smaller responsiveness parameter than the conventional liquid crystal mixture (Mixture 1).

Example 3

To Mixture 1, the following compound (1-3), which is an example of the compound of the formula (1), was added in the following ratio to prepare Mixture C.

| Components of Mixture C | | Mole % |
|---|---|---|
| Mixture 1 | | 87.0 |
| Compound (1-3) | NC—⬢—≡—⬢—C(F)=$C_4H_9$(F) | 13.0 |

The birefringences ($\Delta n$), upper limit temperatures of nematic phase and responsiveness parameters of Mixtures 1 and C are shown in Table 3.

TABLE 3

Birefringences ($\Delta n$), Upper limit temperatures of nematic phase and Responsiveness parameters

| | Mixture 1 | Mixture C |
|---|---|---|
| $\Delta n$ | 0.107 | 0.139 |
| Upper limit temperature of nematic phase (°C.) | 55.5 | 63.2 |
| Responsiveness parameter (Pas) | 3.71 | 2.78 |

As seen from the results in Table 3, Liquid crystal mixture C of the present invention had the larger birefringence, higher upper limit temperature of nematic phase, and smaller responsiveness parameter than the conventional liquid crystal mixture (Mixture 1).

Example 4

To Mixture 1, the following compound (1-4), which is an example of the compound of the formula (1), was added in the following ratio to prepare Mixture D.

| Components of Mixture D | Mole % |
| --- | --- |
| Mixture 1 | 88.8 |
| Compound (1-4) | 11.2 |

F₃CO—⟨⟩—≡—⟨⟩—C(F)(F)—C₄H₉

The birefringences (Δn), upper limit temperature of nematic phase and responsiveness parameters of Mixtures 1 and D are shown in Table 4.

TABLE 4

Birefringences (Δn), Upper limit temperatures of nematic phase and Responsiveness parameters

|  | Mixture 1 | Mixture D |
| --- | --- | --- |
| Δn | 0.107 | 0.125 |
| Upper limit temperature of nematic phase (°C.) | 55.5 | 55.9 |
| Responsiveness parameter (Pas) | 3.71 | 2.42 |

As seen from the results in Table 4, Liquid crystal mixture D of the present invention had the larger birefringence, higher upper limit temperature of nematic phase, and smaller responsiveness parameter than the conventional liquid crystal mixture (Mixture 1).

Example 5

As compounds of the formulas (3) and (4), the compounds (3-1), (3-2) and (3-3) and the compounds (4-1) and (4-2) were mixed in the following ratio to prepare Mixture 2.

| Components of Mixture 2 | Mole % |
| --- | --- |
| Compound (3-1) | 31.5 |

C₃H₇—⟨⟩—⟨⟩—≡—⟨F⟩—CH=CH—C₃H₇

| Compound (3-2) | 35.0 |
| --- | --- |

C₃H₇—⟨⟩—≡—⟨F⟩—CH=CH—C₃H₇

| Compound (3-3) | 23.5 |
| --- | --- |

C₃H₇—⟨⟩—≡—⟨F⟩—CH=CH—C₃H₇

| Compound (4-1) | 4.0 |
| --- | --- |

CN—⟨⟩—≡—⟨⟩—CH=CH—C₃H₇

| Components of Mixture 2 | Mole % |
| --- | --- |
| Compound (4-2) | 6.0 |

CN—⟨F⟩—≡—⟨⟩—CH=CH—C₃H₇

To Mixture 2, the following compound (1-2), which is an example of the compound of the formula (1), was added in the following ratio to prepare Mixture E.

| Components of Mixture E | Mole % |
| --- | --- |
| Mixture 2 | 92.6 |
| Compound (1-2) | 7.4 |

C₃H₇—⟨⟩—⟨⟩—≡—⟨⟩—C(F)(F)—C₄H₉

The birefringences (Δn), upper limit temperatures of nematic phase and responsiveness parameters of Mixtures 2 and E are shown in Table 5.

TABLE 5

Birefringences (Δn), Upper limit temperatures of nematic phase and Responsiveness parameters

|  | Mixture 2 | Mixture E |
| --- | --- | --- |
| Δn | 0.290 | 0.297 |
| Upper limit temperature of nematic phase (°C.) | 149.2 | 157.4 |
| Responsiveness parameter (Pas) | 0.35 | 0.35 |

As seen from the results in Table 5, Liquid crystal mixture A of the present invention had the larger birefringence and the higher upper limit temperature of nematic phase than the conventional liquid crystal mixture (Mixture 2), while the responsiveness parameters were the same.

Example 6

As compounds of the formulas (3), (4) and (2), the compound (3-1), the compound (4-3) and the compounds (2-4), (2-5) and (2-6) were mixed in the following ratio to prepare Mixture 3.

| Components of Mixture 2 | Mole % |
| --- | --- |
| Compound (3-1) | 18.0 |

C₃H₇—⟨⟩—⟨⟩—≡—⟨F⟩—CH=CH—C₃H₇

| Compound (4-3) | 4.5 |
| --- | --- |

F—⟨F⟩—≡—⟨⟩—CH=CH—C₃H₇

| Components of Mixture 2 | Mole % |
|---|---|
| Compound (2-4) | 40.1 |
| $C_3H_7$—⬡—⬢—CN | |
| Compound (2-5) | 26.4 |
| $C_3H_7$—⬡—⬢—$OC_2H_5$ | |
| Compound (2-6) | 11.0 |
| $C_3H_7$—⬡—⬡—$C_4H_9$ | |

To Mixture 3, the following compound (1-2), which is an example of the compound of the formula (1), was added in the following ratio to prepare Mixture F.

| Components of Mixture F | Mole % |
|---|---|
| Mixture 3 | 93.3 |
| Compound (1-2) | 6.7 |

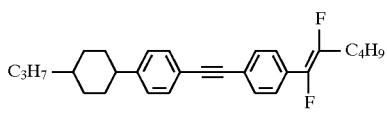

The birefringences (Δn), upper limit temperatures of nematic phase and responsiveness parameters of Mixtures 3 and F are shown in Table 6.

TABLE 6

Birefringences (Δn), Upper limit temperatures of nematic phase and Responsiveness parameters

|  | Mixture 3 | Mixture F |
|---|---|---|
| Δn | 0.165 | 0.180 |
| Upper limit temperature of nematic phase (°C.) | 97.8 | 111.9 |
| Responsiveness parameter (Pas) | 0.58 | 0.53 |

As seen from the results in Table 6, Liquid crystal mixture F of the present invention had the larger birefringence, higher upper limit temperature of nematic phase, and smaller responsiveness parameter than the conventional liquid crystal mixture (Mixture 3).

Example 7

To Mixture 1 prepared in Example 1, the following compound (1-5), which is an example of the compound of the formula (1), was added in the following ratio to prepare Mixture G.

| Components of Mixture G | Mole % |
|---|---|
| Mixture 1 | 86.5 |
| Compound (1-5) | 13.5 |

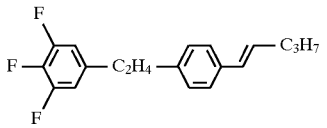

The birefringences (Δn) at 20° C., lower limit temperatures of nematic phase and responsiveness parameters of Mixtures 1 and G are shown in Table 7.

TABLE 7

Birefringences (Δn), Lower limit temperatures of nematic phase and Responsiveness parameters

|  | Mixture 1 | Mixture G |
|---|---|---|
| Δn | 0.107 | 0.107 |
| Lower limit temperature of nematic phase (°C.) | −1 | <−50 |
| Responsiveness parameter (Pas) | 3.71 | 3.51 |

As seen from the results in Table 7, Liquid crystal mixture G of the present invention had the decreased lower limit temperature of nematic phase and smaller responsiveness parameter than the conventional liquid crystal mixture (Mixture 1).

Example 8

To Mixture 1 prepared in Example 1, the following compounds (1-5) and (1-6), which are examples of the compound of the formula (1), were added in the following ratio to prepare Mixture H.

| Components of Mixture H | Mole % |
|---|---|
| Mixture 1 | 83.0 |
| Compound (1-5) ![structure] | 1.20 |
| Compound (1-6) $F_3C$—⬢—$CH_2O$—⬢—⁄⁄—$C_3H_7$ | 5.0 |

The birefringences (Δn) at 20° C., lower limit temperatures of nematic phase and responsiveness parameters of Mixtures 1 and H are shown in Table 8.

TABLE 8

Birefringences (Δn), Lower limit temperatures of nematic phase and Responsiveness parameters

|  | Mixture 1 | Mixture H |
|---|---|---|
| Δn | 0.107 | 0.107 |
| Lower limit temperature of nematic phase (°C.) | −1 | <−50 |
| Responsiveness parameter (Pas) | 3.71 | 3.50 |

As seen from the results in Table 8, Liquid crystal mixture H of the present invention had the decreased lower limit temperature of nematic phase and smaller responsiveness parameter than the conventional liquid crystal mixture (Mixture 1).

Example 9

To Mixture 1 prepared in Example 1, the following compound (1-7), which is an example of the compound of the formula (1), was added in the following ratio to prepare Mixture I.

| Components of Mixture I | | Mole % |
|---|---|---|
| Mixture 1 | | 91.6 |
| Compound (1-7) | $C_3H_7$—⬡—C(F)=C(F)—⬡—CH=CH—$C_3H_7$ | 8.4 |

The birefringences (Δn) at 20° C., upper and lower limit temperatures of nematic phase and responsiveness parameters of Mixtures 1 and I are shown in Table 9.

TABLE 9

Birefringences (Δn), Upper and lower limit temperatures of nematic phase and Responsiveness parameters

|  | Mixture 1 | Mixture I |
|---|---|---|
| Δn | 0.107 | 0.136 |
| Upper limit temperature of nematic phase (°C.) | 56 | 62 |
| Lower limit temperature of nematic phase (°C.) | −1 | <−50 |
| Responsiveness parameter (Pas) | 3.71 | 2.16 |

As seen from the results in Table 9, Liquid crystal mixture I of the present invention had the larger birefringence, wider temperature range of nematic phase and smaller responsiveness parameter than the conventional liquid crystal mixture (Mixture 1).

Example 10

As compounds of the formulas (2) and (6), the compounds (2-2), (2-3) and (2-1) and the compound (6-1) were mixed in the following ratio to prepare Mixture 4.

| Components of Mixture 4 | | Mole % |
|---|---|---|
| Compound (2-3) | $C_7H_{15}$—⬡—COO—⬡—CN | 19.1 |
| Compound (2-2) | $C_5H_{11}$—⬡—⬡—CN | 23.9 |
| Compound (2-1) | $C_5H_{11}$—⬡—⬡—CN | 47.0 |
| Compound (6-1) | $C_3H_7$—⬡—⬡—⬡—CH=CH—$C_3H_7$ | 10.0 |

To Mixture 4, the following compounds (1-7) and (1-8), which are examples of the compound of the formula (1), were added in the following ratio to prepare Mixture J.

| Components of Mixture J | | Mole % |
|---|---|---|
| Mixture 4 | | 75.0 |
| Compound (1-7) | $C_3H_7$—⬡—C(F)=C(F)—⬡—CH=CH—$C_3H_7$ | 20.0 |
| Compound (1-8) | $C_3H_7$—⬡—⬡—C(F)=C(F)—⬡—CH=CH—$C_3H_7$ | 5.0 |

The birefringences (Δn), upper and lower limit temperatures of nematic phase and responsiveness parameters of Mixtures 4 and J are shown in Table 10.

TABLE 10

Birefringences (Δn), Upper and lower limit temperatures of nematic phase and Responsiveness parameters

|  | Mixture 4 | Mixture J |
|---|---|---|
| Δn | 0.129 | 0.194 |
| Upper limit temperature of nematic phase (°C.) | 73 | 100 |
| Lower limit temperature of nematic phase (°C.) | 6 | −9 |
| Responsiveness parameter (Pas) | 2.68 | 1.23 |

As seen from the results in Table 10, Liquid crystal mixture J of the present invention had the larger birefringence, wider temperature range of nematic phase and smaller responsiveness parameter than the conventional liquid crystal mixture (Mixture 4).

Example 11

As compounds of the formulas (2) and (3), the compounds (2-4), (2-5) and (2-6) and the compound (3-1) were mixed in the following ratio to prepare Mixture 5.

| Components of Mixture 5 | Mole % |
|---|---|
| Compound (2-4) | 45.0 |
| $C_3H_7$—⟨⟩—⟨⟩—CN | |
| Compound (2-5) | 18.9 |
| $C_3H_7$—⟨⟩—⟨⟩—$OC_2H_5$ | |
| Compound (2-6) | 26.1 |
| $C_3H_7$—⟨⟩—⟨⟩—$C_4H_9$ | |
| Compound (3-1) | 10.0 |
| $C_3H_7$—⟨⟩—⟨⟩—≡—⟨F⟩—/=/—$C_3H_7$ | |

To Mixture 5, the following compound (1-7), which is an example of the compound of the formula (1), was added in the following ratio to prepare Mixture K.

| Components of Mixture K | Mole % |
|---|---|
| Mixture 5 | 85.5 |
| Compound (1-7) | 15.5 |
| $C_3H_7$—⟨⟩—(F)C=C(F)—⟨⟩—/=/—$C_3H_7$ | |

The birefringences (Δn), upper and lower limit temperatures of nematic phase and responsiveness parameters of Mixtures 5 and K are shown in Table 11.

TABLE 11

Birefringences (Δn), Upper and lower limit temperatures of nematic phase and Responsiveness parameters

|  | Mixture 5 | Mixture K |
|---|---|---|
| Δn | 0.122 | 0.164 |
| Upper limit temperature of nematic phase (°C.) | 64 | 71 |
| Lower limit temperature of nematic phase (°C.) | −10 | −35 |
| Responsiveness parameter (Pas) | 0.93 | 0.49 |

As seen from the results in Table 11, Liquid crystal mixture K of the present invention had the larger birefringence, increased upper limit and decreased lower limit of nematic phase and therefore wider temperature range of nematic phase and smaller responsiveness parameter than the conventional liquid crystal mixture (Mixture 5).

To Mixture K, the following compounds (7-1) and (7-2), which are examples of the compound of the formula (7), were further added in the following ratio to prepare Mixture L.

| Components of Mixture L | Mole % |
|---|---|
| Mixture K | 81.0 |
| Compound (7-1) | 9.0 |
| 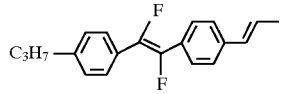 | |
| Compound (7-2) | 10.0 |

The threshold voltages of Mixtures K and L are shown in Table 12.

TABLE 12

| | Threshold voltage | |
|---|---|---|
| | Mixture K | Mixture L |
| Threshold voltage (V) | 1.65 | 1.54 |

The addition of the compound of the formula (7) decreased the threshold voltage.

The present invention can provide the liquid crystal mixture having the large birefringence (Δn), increased upper limit temperature of nematic phase and thus widened temperature range of nematic phase, and decreased responsiveness parameter. Such the liquid crystal mixture is very useful as a material constituting a liquid crystal display device such as a super twisted nematic (STN) liquid crystal device or a polymer dispersed liquid crystal (PDLC) device, and so on.

What is claimed is:

1. A liquid crystal mixture comprising at least one compound of the formula (1):

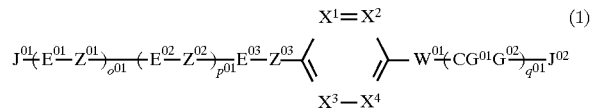

wherein $J^{01}$ represents a hydrogen or fluorine atom, a cyano group or a group of the formula: $J^{03}(O)$ $m^{01}$ in which $J^{03}$ is a $C_1$–$C_{12}$ alkyl group, a $C_2$–$C_{12}$ alkenyl group or a $C_2$–$C_{12}$ alkynyl group, each of which may be substituted with a fluorine atom;

$E^{01}$, $E^{02}$ and $E^{03}$ represent, independently each other,

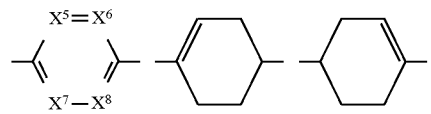

or 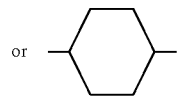

$Z^{01}$ and $Z^{02}$ represent, independently each other, a single bond, —$(CH_2)n^{01}$—, —C≡C—, —CH=CH—, —$CH_2O$—, —$OCH_2$—, —COO—, —OCO— or —O—, and $Z^{03}$ represent a single bond, —$(CH_2)n^{01}$—, —C≡C—, —CH=CH—, —$CH_2O$—, —$OCH_2$—, —COO—, —OCO—,—O— or —CF=CF—, provided that $Z^{01}$, $Z^{02}$ and $Z^{03}$ are not single bonds at the same time;

$n^{01}$ represents and integer of 1 to 4;

$m^{01}$, $o^{01}$, $p^{01}$ and $q^{01}$ represent, independently each other, 0 or 1; $X^1$, $X^2$, $X^3$, $X^4$, $X^6$, $X^7$ and $X^8$ represent, independently each other, CH, CF or N;

$X^5$ represents CH or CF;

$G^{01}$ and $G^{02}$ represent, independently each other, a hydrogen or fluorine atom, provided that they are not hydrogen atoms at the same time;

$w^{01}$ represent —C≡C— or —CY$^{01}$=CY$^{02}$— in which $Y^{01}$ and $Y^{02}$ represent, independently each other a hydrogen or fluorine atom, provided that $Y^{01}$ and $Y^{02}$ are hydrogen atoms, $q^{01}$ is zero and $E^{01}$ and $E^{02}$ are not

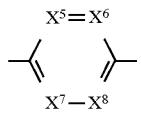

when $Z^{03}$ represents —CF=CF—,
or provided that $W^{01}$ represents —CY$^{01}$=CY$^{02}$— in which at least one of $Y^{01}$ and $Y^{02}$ is a fluorine atom when $Z^{03}$ represent —C≡C— and $q^{01}$ is 0;
and $J^{02}$ represents a $C_1$–$C_{12}$ alkyl group or a $C_1$–$C_{12}$ alkoxyalkyl group, each of which may be substituted with at least one fluorine atom, and at least one compound of the formula (2):

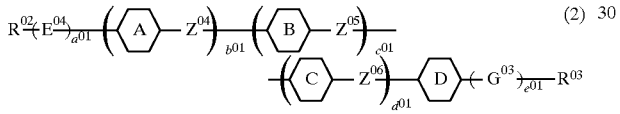

wherein the rings A, B, C and D represent, independently each other, 1,4-phenylene which may be substituted with 1, 2 or 3 fluorine atoms, 1,4-cyclohexylene, 1,4-cyclohexelene, 4,1-cyclohexelene, 2,5-cyclohexelene, 5,2-cyclohexelene, 3,6-cyclohexelene, 6,3-cyclohexelene, 2,5-pyrimidinediyl, 5,2-pyrimidinediyl, 2,5-pyridinediyl, 5,2-pyridinediyl, 2,5-dioxanediyl or 5,2-dioxanediyl;

$R^{02}$ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group;

$R^{03}$ is a hydrogen or fluorine atom, a fluoromethyl group, a difluoromethyl group, a trifluoromethyl group, a fluoromethoxy group, a difluoromethoxy group, a trifluoromethyl group, a cyano group, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group;

$Z^{04}$, $Z^{05}$ and $Z^{06}$ represent, independently each other, —COO—, —OCO—, —OCH$_2$—, —CH$_2$O—, a $C_1$–$C_5$ alkylene group, a $C_2$–$C_5$ alkenylene group, a $C_2$–$C_5$ alkynylene group or a single bond; $E^{04}$ and $G^{03}$ represent independently each other, a methylene group or —O—; $a^{01}$, $b^{01}$, $c^{01}$, $d^{01}$ and $e^{01}$ represent, independently each other, 0 or 1, provided that the sum of $b^{01}$, $c^{01}$ and $d^{01}$ is at least 1 (one), with the proviso that $a^{01}$ is 0 when $R^{02}$ is an alkoxy group, that $e^{01}$ is 0 when $R^{03}$ is an alkoxy group, or with the proviso that, in the case where $R^{02}$ and $R^{03}$ are not alkoxy groups, $a^{01}$ is 1 when $b^{01}$ is 1 (one) and the ring A is 1,4-phenylene, 2,5-pyrimidinediyl, 5,2-pyrimidinediyl, 2,5-pyridinediyl or 5,2-pyridinediyl or when $b^{01}$ is 0, $c^{01}$ is 1 and the ring D is 1,4-phenylene, 2,5-pyrimidinediyl, 5,2-pyrimidinediyl, 2,5-pyridinediyl or 5,2-pyridinediyl or when $b^{01}$ is 0, $c^{01}$ is 0, $d^{01}$ is 1 and the ring C is 1,4-phenylene, 2,5-pyrimidinediyl, 5,2-pyrimidinediyl, 2,5-pyridinediyl or 5,2-pyridinediyl, or $e^{01}$ is 1 when the ring D is 1,4-phenylene, 2,5-pyrimidinediyl, 5,2-pyrimidinediyl, 2,5-pyridinediyl or 5,2-pyridinediyl, which compound (2) is not a compound of the formula (1).

2. A liquid crystal mixture comprising at least one compound of the formula (1) as defined in claim 1 and at least one compound selected from the group consisting of a compound of the formula (3):

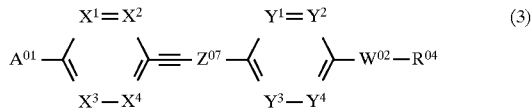

wherein $R^{04}$ is a $C_1$–$C_{12}$ alkyl group, a $C_2$–$C_{16}$ alkenyl group or a $C_2$–$C_{16}$ alkoxyalkyl group which may be substituted with at least one fluorine atom;

$X^1$, $X^2$, $X^3$, $X^4$, $Y^1$, $Y^2$, $Y^3$ and $Y^4$ represent, independently each other, CH, CF or N;

$A^{01}$ is a hydrogen atom, a 4-$R^{05}$-(cycloalkyl) group, a 4-$R^{05}$-(cycloalkenyl) group or a $R^{05}$—(O)$r^{01}$ group in which $R^{05}$ is a $C_1$–$C_{12}$ alkyl group, a $C_2$–$C_{12}$ alkenyl group, a $C_2$–$C_{12}$ alkynyl group or a $C_2$–$C_{12}$ alkoxyalkyl group, each of which may be substituted with at least one fluorine atom;

$W^{02}$ is trans —C=C— or —C≡C—;

$Z^{07}$ is —C≡C— or a single bond; and $r^{01}$ represents 0 or 1, a compound of the formula (4):

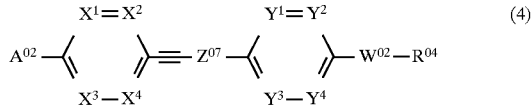

wherein $A^{02}$ is a fluorine atom, a trifluoromethyl or trifluoromethoxy group or a cyano group, and $R^{04}$, $X^1$, $X^2$, $X^3$, $X^4$, $Y^1$, $Y^2$, $Y^3$, $Y^4$, $W^{02}$ and $Z^{07}$ are the same as defined above, and a compound of the formula (5):

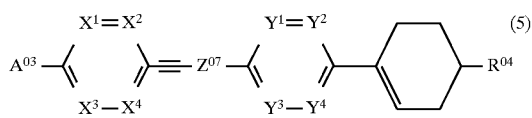

wherein $A^{03}$ is a fluorine atom, a trifluoromethyl group, a trifluoromethoxy group, a cyano group, a $C_1$–$C_{12}$ alkyl group, a $C_2$–$C_{12}$ alkenyl group, a $C_2$–$C_{12}$ alkoxyalkyl group, 4-$R^{05}$-(cycloalkyl) group, a 4-$R^{05}$-(cycloalkenyl) group or a $R^{05}$—(O)$r^{01}$ group, and $R^{04}$, $X^1$, $X^2$, $X^3$, $X^4$, $Y^1$, $Y^2$, $Y^3$, $Y^4$, $W^{02}$, $Z^{07}$ and $R^{05}$ are the same as defined above.

3. A liquid crystal mixture comprising at least one compound of the formula (1) as defined in claim 1, at least one compound of the formula (2) as defined in claim 1, and at least one compound selected from the group consisting of a compound of the formula (3) as defined in claim 2, a compound of the formula (4) as defined in claim 2 and a compound of the formula (5) as defined in claim 2.

4. A liquid crystal mixture comprising at least one compound of the formula (1) as defined in claim 1, at least one compound of the formula (2) as defined in claim 1, and at least one compound selected from the group consisting of a compound of the formula (6):

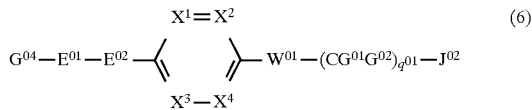

wherein
$G^{04}$ is a hydrogen or fluorine atom, a cyano group or $G^{05}$—(O)$y^{01}$ in which $G^{05}$ is a $C_1$–$C_{12}$ alkyl group, a $C_2$–$C_{12}$ alkenyl group, a $C_2$–$C_{12}$ alkynyl group, each of which may be substituted with at least one fluorine atom, and $y^{01}$ is 0 or 1;
$E^{01}$ and $E^{02}$ represent, independently each other,

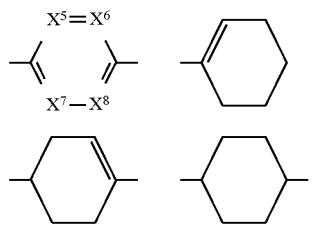

provided that at least one of $E^{01}$ and $E^{02}$ is a cyclohexylene or cyclohexulene group, and $X^1, X^2, X^3, X^4, X^5, X^6, X^7, X^8, W^{01}, G^{01}, G^{02}, J^{02}$ and $q^{01}$ are the same as defined above, and a compound of the formula (7):

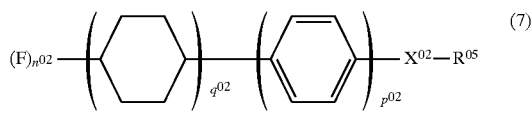

wherein the benzene may be substituted with 1, 2 or 3 fluorine atoms; $R^{05}$ is a $C_1$–$C_{10}$ alkyl group; $n^{02}, p^{02}$, and $q^{02}$ represent, independently each other, 1 or 2; $X^{02}$ is trans —CH=CH— or —C≡C—, provided that $X^{02}$ may be —CH$_2$CH$_2$— when $n^{02}$ is 1.

5. A liquid crystal mixture comprising at least one compound of the formula (1) as defined in claim 1, at least one compound selected from the group consisting of a compound of the formula (3) as defined in claim 2, a compound of the formula (4) as defined in claim 2 and a compound of the formula (5) as defined in claim 2, and at least one compound selected from the group consisting of a compound of the formula (6) as defined in claim 4 and a compound of the formula (7) as defined in claim 4.

6. A liquid crystal mixture comprising at least one compound of the formula (1) as defined in claim 1, at least one compound of the formula (2) as defined in claim 1, at least one compound selected from the group consisting of a compound of the formula (3) as defined in claim 2, a compound of the formula (4) as defined in claim 2 and a compound of the formula (5) as defined in claim 2, and at least one compound selected from the group consisting of a compound of the formula (6) as defined in claim 4 and a compound of the formula (7) as defined in claim 4.

7. The liquid crystal mixture according to any one of claims 1, 3, 4 and 6, wherein said ring D in the formula (2) is one group selected from the group consisting of 1,4- phenylene which may be substituted with 1, 2 or 3 fluorine atoms, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl and 5,2-dioxanediyl.

8. The liquid crystal mixture according to any one of claims 1, 3, 4 and 6 wherein said compound of the formula (2) is a compound of the formula (8):

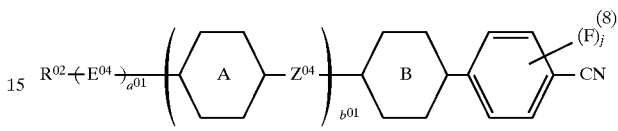

wherein $R^{02}, E^{04}$, the rings A and B, $Z^{04}, a^{01}$ and $b^{01}$ are the same as defined above and j is 0, 1 or 2, a compound of the formula (9):

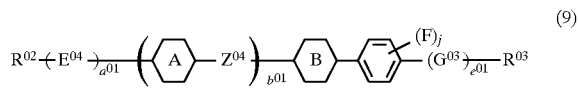

wherein $R^{02}, R^{03}$, the rings A and B, $E^{04}, G^{03}, Z^{04}, e^{01}, a^{01}, b^{01}$ and are the same as defined above, a compound of the formula (10):

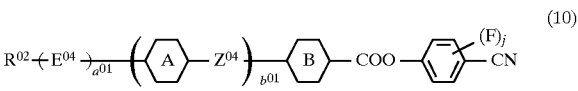

wherein $R^{02}, R^{03}$, the rings A and B, $E^{04}, Z^{04}, a^{01}, b^{01}$ and j are the same as defined above, or a compound of the formula (11):

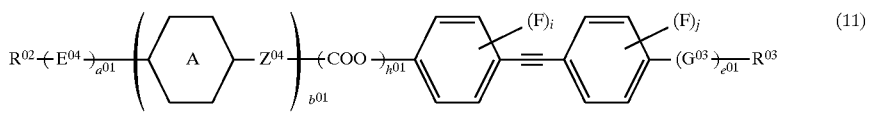

wherein $R^{02}, R^{03}$, the rings A and B, $E^{04}, G^{03}, Z^{04}, a^{01}, b^{01}, e^{01}$ and are the same as defined above, and i is 0, 1 or 2.

9. The liquid crystal mixture according to claim 1, wherein a mole ratio of the compound of the formula (1) to the compound of the formula (2) is between 5:95 and 50:50.

10. The liquid crystal mixture according to claim 2, wherein a molar ratio of the compound of the formula (1) to at least one compound selected from the group consisting of the compounds of the formulas (3), (4) and (5) is between 5:95 and 50:50.

11. The liquid crystal mixture according to claim 3, wherein mole percentages of the compound of the formula (1), the compound of the formula (2) and at least one compound selected from the group consisting of the compounds of the formulas (3), (4) and (5) are 5 to 50 mole %, 10 to 90 mole % and 5 to 85 mole %, respectively, with the total mole percentage being 100 mole %.

12. The liquid crystal mixture according to claim 4, wherein mole percentages of the compound of the formula (1), the compound of the formula (2) and at least one compound selected from the group consisting of the compounds of the formulas (6) and (7) are 5 to 50 mole %, 25 to 94 mole % and 1 to 25 mole %, respectively, with the total mole percentage being 100 mole %.

13. The liquid crystal mixture according to claim 5, wherein mole percentages of the compound of the formula (1), at least one compound selected from the group consisting of the compounds of the formulas (3), (4) and (5), and at least one compound selected from the group consisting of the compounds of the formulas (6) and (7) are 5 to 50 mole %, 25 to 94 mole % and 1 to 25 mole %, respectively, with the total mole percentage being 100 mole %.

14. The liquid crystal mixture according to claim 6, wherein mole percentages of the compound of the formula (1), the compound of the formula (2), at least one compound selected from the group consisting of the compounds of the formulas (3), (4) and (5), and at least one compound selected from the group consisting of the compounds of the formulas (6) and (7) are 5 to 50 mole %, 10 to 84 mole %, 10 to 84 mole % and 1 to 25 mole %, respectively, with the total mole percentage being 100 mole %.

15. A liquid crystal device comprising a pair of electrode substrates, and a layer of a liquid crystal mixture as claimed in any one of claims 1 to 6 which is interposed between said pair of the electrode substrates.

* * * * *